US012315318B2

(12) United States Patent
Fisher et al.

(10) Patent No.: US 12,315,318 B2

(45) Date of Patent: May 27, 2025

(54) ELECTRONIC LOCKBOX WITH SENSOR AND REMOVABLE MAGNETIC KEY FOB

(71) Applicant: SentriLock, LLC, Cincinnati, OH (US)

(72) Inventors: Scott R. Fisher, West Chester, OH (US); Tyler S. Witt, South Lebanon, OH (US); Madelyn G. Bollinger, West Chester, OH (US); Christopher A Hunt, Mason, OH (US)

(73) Assignee: SentriLock, LLC, Cincinnati, OH (US)

( * ) Notice: Subject to any disclaimer, the term of this patent is extended or adjusted under 35 U.S.C. 154(b) by 84 days.

(21) Appl. No.: 18/243,459

(22) Filed: Sep. 7, 2023

(65) Prior Publication Data

US 2024/0087387 A1 Mar. 14, 2024

Related U.S. Application Data

(60) Provisional application No. 63/404,695, filed on Sep. 8, 2022.

(51) Int. Cl.
*G07C 9/00* (2020.01)

(52) U.S. Cl.
CPC ..... *G07C 9/00912* (2013.01); *G07C 9/00182* (2013.01); *G07C 9/00738* (2013.01); *G07C 2009/00984* (2013.01)

(58) Field of Classification Search
CPC ............ G07C 9/00912; G07C 9/00182; G07C 9/00738; G07C 2009/00936; E05B 19/0005
See application file for complete search history.

(56) References Cited

U.S. PATENT DOCUMENTS

| | | | |
|---|---|---|---|
| 5,388,439 | A | 2/1995 | Miller |
| 5,654,696 | A | 8/1997 | Barrett |
| 5,705,991 | A | 1/1998 | Kniffin |
| 5,791,172 | A | 8/1998 | Deighton |
| 6,427,973 | B1 | 8/2002 | Harold |

(Continued)

FOREIGN PATENT DOCUMENTS

| | | |
|---|---|---|
| WO | 1993014571 | 7/1993 |
| WO | 2011065892 | 6/2011 |
| WO | 2016200814 | 12/2016 |

OTHER PUBLICATIONS

ISA International Search Report; PCT/US23/32193, mailed on Feb. 21, 2024; 12 pages.

*Primary Examiner* — Nabil H Syed
(74) *Attorney, Agent, or Firm* — Frederick H. Gribbell; Russell F. Gribbell

(57) ABSTRACT

An electronic lockbox with a single sensor that can detect both the position of a key compartment component (or a movable key bin) and the presence of a removable key fob (attached to a building key). The key compartment includes a first magnet and the removable key fob includes a second magnet. The single sensor can detect the presence of neither magnet, the first magnet alone, or both the first and second magnet together. If neither magnet is detected, then the key compartment (movable bin) is open. If only the first magnet is detected, then the key compartment (movable bin) has been closed without the removable key fob. If both the first and second magnets are detected, then the key compartment (movable bin) is closed with the removable key fob inside the movable bin.

20 Claims, 17 Drawing Sheets

Key Bin Position Without Key Fob

(56) References Cited

U.S. PATENT DOCUMENTS

| | | | | |
|---|---|---|---|---|
| 6,624,742 | B1 | 9/2003 | Romano | |
| 6,761,051 | B1 | 7/2004 | Tsai | |
| 6,822,553 | B1 | 11/2004 | Henderson | |
| 6,842,105 | B1 | 1/2005 | Henderson | |
| 6,937,140 | B1 | 8/2005 | Outslay | |
| 7,177,819 | B2 | 2/2007 | Muncaster | |
| 7,606,558 | B2 | 10/2009 | Despain | |
| 7,880,584 | B2 | 2/2011 | Larson | |
| 8,040,218 | B2 | 10/2011 | Hays | |
| 8,683,833 | B2 | 4/2014 | Marschalek | |
| 9,336,637 | B2 | 5/2016 | Neil | |
| 11,352,817 | B2 | 6/2022 | Gengler | |
| 2002/0107010 | A1 | 8/2002 | Witte | |
| 2003/0179075 | A1 * | 9/2003 | Greenman ............. | G07C 9/215 340/5.73 |
| 2004/0219903 | A1 | 11/2004 | Despain | |
| 2005/0207087 | A1 | 9/2005 | Fisher | |
| 2006/0283216 | A1 | 12/2006 | Marcelle | |
| 2007/0156758 | A1 | 7/2007 | Adiga | |
| 2008/0246587 | A1 | 10/2008 | Fisher | |
| 2009/0153291 | A1 | 6/2009 | Larson | |
| 2009/0293562 | A1 | 12/2009 | Fisher | |
| 2010/0245107 | A1 | 9/2010 | Fukler | |
| 2011/0251876 | A1 | 10/2011 | Fisher | |
| 2011/0254659 | A1 | 10/2011 | Bowen | |
| 2012/0068817 | A1 | 3/2012 | Fisher | |
| 2012/0213362 | A1 | 8/2012 | Bliding | |
| 2013/0214903 | A1 | 8/2013 | Kalous | |
| 2014/0236350 | A1 | 8/2014 | Woodard | |
| 2014/0266586 | A1 | 9/2014 | Fisher | |
| 2014/0359292 | A1 | 12/2014 | Kawamura | |
| 2016/0119961 | A1 | 4/2016 | Hrabak | |
| 2017/0104735 | A1 | 4/2017 | Brown et al. | |
| 2018/0190056 | A1 * | 7/2018 | Desinor, Jr. ........ | G07C 9/00309 |
| 2019/0234113 | A1 | 8/2019 | Neau | |
| 2019/0383057 | A1 | 12/2019 | Larson | |
| 2020/0002973 | A1 | 1/2020 | Hill | |
| 2020/0071955 | A1 | 3/2020 | Binek | |
| 2020/0071965 | A1 | 3/2020 | Zacchio | |
| 2020/0157844 | A1 | 5/2020 | Spath | |
| 2020/0312067 | A1 | 10/2020 | Fisher et al. | |
| 2021/0047864 | A1 * | 2/2021 | Kuenzi ............... | E05B 19/0005 |
| 2022/0180681 | A1 | 6/2022 | Ufkes | |

* cited by examiner

STATE 1

STATE 2

ELECTRONIC LOCKBOX WITH SENSOR AND REMOVABLE MAGNETIC KEY FOB

CROSS-REFERENCE TO RELATED APPLICATIONS

The present application claims priority to provisional patent application Ser. No. 63/404,695, titled "ELECTRONIC LOCKBOX WITH SENSOR AND REMOVABLE MAGNETIC KEY FOB," filed on Sep. 8, 2022.

TECHNICAL FIELD

The technology disclosed herein relates generally to electronic locking equipment and is particularly directed to an electronic lockbox of the type which uses a single sensor to detect two different conditions: (1) if a movable key bin is closed, and also (2) if a removable key fob is in the closed movable key bin. Embodiments are specifically disclosed as an electronically controlled lockbox with a magnetic sensor, a movable key bin including a first magnet, and a removable key fob including a second magnet, in which the presence of the removable key fob and an open or closed position of the movable key bin are detected based on the magnetic field magnitude level measured by the single magnetic sensor.

The magnetic sensor is mounted in the main body of the electronic lockbox, at a position that is proximal to where the movable key bin becomes positioned, once the movable key bin is inserted into the lockbox. The magnetic sensor is used to determine (detect) a magnetic field at all times when the lockbox's system controller activates that electronic circuit. A Hall effect sensor is a preferred type of magnetic sensor for this purpose.

The movable key bin is designed to include a small (first) permanent magnet, which is mounted in the movable key bin at a predetermined location of the movable key bin. The lockbox's magnetic sensor is mounted in the wall of the structure that at least partially surrounds the space where the movable key bin is to be inserted. These mounting positions are important to the operation of the magnetic sensor, as will be discussed below. Also: the construction of these components, i.e., the sizes and shapes of the movable key bin itself, and of the lockbox structure that at least partially surrounds the movable key bin's space, are to be selected such that it will be virtually impossible to fool the magnetic sensor in its determinations that are discussed below.

If the movable key bin is in its closed (inserted) position, the key bin magnet will be positioned proximal to the magnetic sensor, and that sensor then effectively measures the magnitude of a magnetic field produced by that key bin magnet. Generally speaking, the magnitude of that magnetic field will be within a predetermined range that will be expected by the electronic circuitry of the electronic lockbox, assuming there is no other nearby magnetic field being produced in that region of the lockbox. As noted above, the physical structures of the lockbox and of the movable key bin (their sizes and shapes) are designed to make it difficult to fool the lockbox's detection scheme.

The removable key fob is the other main item that the lockbox is interested in detecting, using the magnetic sensor that is discussed above. This key fob is generally designed to be attached to a building key, such as a house key (or other type of dwelling key) or a commercial building key, or even a car key for use with operating automobiles that are sitting in a car dealer's showroom or on a car dealer's parking lot. (Note that, in this description, the term "building key" will have the meaning of any type of physical key that can be used for the purposes mentioned above, whether that building key is a mechanical device or an electronic device. Further, a "building key" may take the form of a "key card" that could possibly be used with some type of scanner that is the actual device that controls access to a specific property being protected by the lockbox. Moreover, for the purposes of this patent disclosure, a "building key" can also refer to a key that opens a lock that is not related to a specific existing building, but instead could be used to protect an empty lot that is for sale or for lease, and that lock could, for example, be mounted on a chain link fence protecting that property.) This removable key fob will also have a fairly specific size and shape, in order for it to physically fit inside the lockbox's movable key bin, along with the building key that it is attached to.

The removable key fob also contains a small (second) magnet, which can be similar in construction to the first magnet that is included in the movable key bin itself. In general, a human user would place the key fob (typically along with its corresponding building key) into the movable key bin when that movable key bin is in its open position, with respect to the electronic lockbox. Then, to 'finish' using that building key (at the site of a property that is being protected by that building key), the movable key bin is fully inserted into the lockbox, in the usual manner. Of course, the building key then becomes protected by that electronic lockbox.

If the removable key fob is inserted into the movable key bin, the second magnet (of the key fob) will be attracted to the first magnet (of the movable key bin). The design of the key fob is such that its magnetic polarity causes this magnetic attraction to occur, which will be explained below in greater detail. (Otherwise, the two magnets could line up in a repulsive physical arrangement, and the key fob's magnet would be repelled by the key bin's magnet, and thus the key fob would not be able to remain inside the movable key bin.)

Assuming the key fob is correctly placed inside the movable key bin, then that key fob will essentially be (magnetically) attached to the movable key bin's magnet. Then, once the movable key bin is inserted into the lockbox into its closed position, the magnetic sensor will measure a second, higher magnetic field magnitude level, because that sensor will detect the presence of a magnetic field being produced by both the first and second magnets.

It will be understood that, if the movable key bin is in its open position, the movable key bin's magnet (the first magnet) will be positioned distal to the magnetic sensor of the lockbox, and therefore, the magnetic sensor will measure the lowest magnetic field magnitude level of this lockbox system. These three different magnetic field magnitude levels thereby will generate three different voltage levels in the output signal produced by the magnetic sensor. This (analog) output signal is directed to, and detected by, an analog-to-digital converter (an "ADC"), and that ADC outputs a digital signal that is directed to a microprocessor in the electronic lockbox. Depending on the measured voltage level (now converted to a digital number), the microprocessor can determine the position of the movable key bin and the presence (or absence) of the removable key fob.

The electronic lockbox can be designed to use more than one type of magnetic sensor, if desired. For example, some magnetic sensors are deemed to be of a "positive polarity" type, also referred herein as a "forward polarity response" sensor, which means that their output voltage will increase as they detect an increasing magnetic field. Some other magnetic sensors are deemed to be of a "negative polarity" type, also referred herein as a "reverse polarity response"

sensor, which means that their output voltage will decrease as they detect an increasing magnetic field. In other words, the negative polarity sensors react in the opposite sense as compared to the positive polarity sensors. With a type of corrective manipulation of the A/D conversion of the voltage signals coming from the magnetic sensors, a given lockbox could include either type of magnetic sensor, using the same computer software for the system controller. This provides great flexibility for the overall lockbox package.

STATEMENT REGARDING FEDERALLY SPONSORED RESEARCH OR DEVELOPMENT

None.

BACKGROUND

Electronic lockboxes used for real estate situations typically include a secure compartment (e.g., a key bin) for holding a building key (for a dwelling, for example), and often include a shackle for attaching the lockbox to the building, often using a doorknob as the attachment point. Typically, lockboxes used for real estate situations do not detect the presence (or absence) of the building key inside the secure compartment. This can lead to situations where a real estate agent forgets to return the building key to the lockbox after a showing, or the building key can be stolen from the lockbox and its absence can be undetected until the next time the lockbox is opened—perhaps days, or weeks, later.

Many conventional lockboxes use a first sensor to detect if the key bin is opened or closed (i.e., removed or inserted, with respect to the lockbox's main body). The type of sensor used for this purpose can be varied, such as magnetic sensors or light-detecting sensors, for example. Some of those conventional lockboxes may use a second sensor to detect whether the appropriate building key has been returned to that lockbox. The type of second sensor could be a bar code reader, for example, or perhaps an RFID chip reader, to detect an RFID chip that could be mounted in a key fob, if desired.

SUMMARY

Accordingly, it is an advantage to provide an electronic lockbox with a single sensor that can detect if a key compartment (e.g., a movable key bin) is in an open or closed position, and also to detect the presence of a removable key fob, when the key compartment is in its closed position.

It is another advantage to provide an electronic lockbox with a single magnetic sensor that can detect multiple magnetic field magnitude levels, in which a lowest detected magnitude level indicates a key compartment (the movable key bin) open position, a second higher detected magnitude level that indicates a key compartment closed position, and a third highest detected magnitude level that indicates a key compartment closed position and a removable key fob is also contained in the key compartment.

It is yet another advantage to provide an electronic lockbox with a single magnetic sensor, a key compartment (the movable key bin) that can open or close including a first magnet, and a removable key fob having a second magnet, in which the second magnet can self-locate onto the first magnet, and the single magnetic sensor can detect (i.e., discriminate between) either the presence of the first magnet alone, or the presence of both the first and second magnets together.

It is still another advantage to provide an electronic lockbox with a single sensor detecting circuit that can detect multiple voltage levels, in which a lowest detected voltage level indicates a key compartment (the movable key bin) open position, a second detected higher voltage level that indicates a key compartment closed position with no key fob therein, and a third detected highest voltage level that indicates a key compartment closed position but also including a removable key fob. A preferred sensor detecting circuit that provides these functions includes a Hall effect sensor that includes a voltage output that is related to the magnetic field being detected, and an analog-to-digital converter that senses the output signal from the Hall effect sensor, and converts that output signal's voltage magnitude into a digital signal that can be forwarded to a microprocessor circuit.

It is a further advantage to provide an electronic lockbox with a single sensor detecting circuit that can detect multiple voltage levels that are output by more than one type of magnetic sensor, in which at least two sensor types have 'opposite' response characteristics. For example, a "forward-acting" sensor will increase its output signal in an increasing magnetic field, while a "reverse-acting" sensor will decrease its output signal in the same increasing magnetic field. The system controller can be programmed with appropriate software code to correctly determine the status of the lockbox's key bin (i.e., whether it is installed, or open) and at the same time, correctly determine the status of the presence or absence of a building key fob that contains a separate magnet.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, an electronic lockbox with a multifunction sensor is provided, which comprises: (a) a housing, the housing including: a bin receptacle space; and a lock that is associated with the bin receptacle space; (b) an electronic control circuit, including: a processing circuit, a memory circuit including instructions executable by the processing circuit, and an input/output interface circuit, wherein the processing circuit is in communication with at least one of the memory circuit and the input/output interface circuit; (c) a movable bin that is either locked in place at the bin receptacle space, or is in a released state so as to be removable from at least a portion of the bin receptacle space, in which the lock is under the control of the processing circuit; (d) a magnetic sensor mounted inside the housing, proximal to the bin receptacle space; (e) a first magnet mounted on the movable bin; (f) a removable magnetic cap that includes a second magnet, in which the removable magnetic cap is magnetically attachable to the first magnet; wherein: (g) the electronic lockbox exhibits three operating states, such that (i) in a first operating state; (A) the movable bin is released from the bin receptacle space, and (B) the first magnet is positioned distal from the magnetic sensor at a sufficiently far distance so that the magnetic sensor effectively does not detect the first magnet; (ii) in a second operating state: (A) the movable bin is locked in place at the bin receptacle space, and (B) the first magnet is positioned proximal to the magnetic sensor at a sufficiently close distance so that the magnetic sensor effectively detects the first magnet; (C) the removable magnetic cap is not attached to the first magnet, and the second magnet is positioned distal from the magnetic sensor at a sufficiently far distance so that the magnetic sensor effectively does not detect the second magnet; (iii) in a third operating state: (A) the movable bin is locked in place at the bin receptacle space; (B) the removable magnetic cap is magnetically attached to the first magnet; and (C) the first magnet and the removable magnetic cap are both positioned proximal to the magnetic sensor at a sufficiently close distance so that the magnetic sensor effectively detects both the first magnet and the second magnet; (h) in the first operating state, the magnetic sensor outputs a first signal having a first voltage magnitude, the first signal is communicated to at least one of the input/output interface circuit and the processing circuit, and, if the first voltage magnitude is within a predetermined first range of values, then the processing circuit determines that the first voltage magnitude indicates that the movable bin is in a released position; (i) in the second operating state, the magnetic sensor outputs the first signal having a second, greater, voltage magnitude, the first signal is communicated to at least one of the input/output interface circuit and the processing circuit, and, if the second voltage magnitude is within a predetermined second range of values, then the processing circuit determines that the second voltage magnitude indicates that the movable bin is in a locked position, and that the removable magnetic cap is not present in the movable bin; and (j) in the third operating state, the magnetic sensor outputs the first signal having a third, yet greater, voltage magnitude, the first signal is communicated to at least one of the input/output interface circuit and the processing circuit, and, if the third voltage magnitude is within a predetermined third range of values, then the processing circuit determines that the third voltage magnitude indicates that the movable bin is in a locked position, and that the removable magnetic cap is present in the movable bin.

In accordance with another aspect, an electronic lockbox is provided, which comprises: (a) a housing that includes a lock; (b) an electronic control circuit, including: a processing circuit, a memory circuit including instructions executable by the processing circuit, and an input/output interface circuit, wherein the processing circuit is in communication with at least one of the memory circuit and the input/output interface circuit; (c) a closable secure container that is either locked in place or is released, which is under the control of the processing circuit; (d) a removable key fob that is storable in the closable secure container; and (e) a single sensor mounted in the housing; wherein: (f) the single sensor is operable to detect whether the closable secure container is locked in place or is released; and (g) if the closable secure container is locked in place, then the single sensor is also operable to detect the presence or absence of the removable key fob.

In accordance with yet another aspect, a magnetic key fob is provided, which comprises: a cup-shaped magnetic cap that includes: (a) an open end that reveals a flange portion and a seat portion, wherein the flange portion is proximal to the open end and the seat portion is distal from the open end; (b) an opposite end that is substantially closed; (c) a permanent magnet that is mounted in the seat portion; and (d) an attachment portion that is mounted to the closed, opposite end.

In accordance with still another aspect, a method for detecting the presence of a closeable secure container and a key fob in an electronic lockbox is provided, in which the method comprises: (a) providing a housing that includes a lock; (b) providing an electronic control circuit, including: a processing circuit, a memory circuit including instructions executable by the processing circuit, and an input/output interface circuit, wherein the processing circuit is in communication with at least one of the memory circuit and the input/output interface circuit; (c) providing a closable secure container that is either locked in place or is released, which is under the control of the processing circuit; (d) providing a removable key fob that is storable in the closable/removable secure container; and (e) providing a single sensor mounted in the housing; wherein: (f) detecting, by the single sensor, whether the closable secure container is locked in place or is released; and (g) detecting, by the single sensor, the presence or absence of the removable key fob, if the closable/removable secure container is locked in place.

In accordance with a further aspect, a method for calibrating a magnetic sensor in an electronic lockbox is provided, in which the method comprises: (a) providing an electronic lockbox, the electronic lockbox comprising: a housing, an electronic control circuit that includes a processing circuit, a memory circuit including instructions executable by the processing circuit, and an input/output interface circuit, and a movable bin that is either locked in place or is released, which is under the control of the processing circuit, a magnet mounted on the movable bin, a magnetic sensor mounted inside the housing, and a removable magnetic cap that is magnetically attachable to the magnet; (b) creating a first state, by releasing the movable bin so that the magnet is positioned distal from the magnetic sensor; (c) creating a second state, by: (i) keeping the removable magnetic cap distal from the magnet; and (ii) moving the movable bin to its locked in place position, so that the magnet is positioned proximal to the magnetic sensor; and (d) creating a third state, by (i) magnetically attaching the removable magnetic cap to the magnet; and (ii) moving the movable bin to its locked in place position, so that the magnet and the removable magnetic cap are both positioned proximal to the magnet; (e) wherein: (i) determining, at the first state, a first magnetic field strength as detected by the magnetic sensor, by measuring a first magnitude of an output signal produced by the magnetic sensor, and assigning the first magnitude as a first calibration point; (ii) determining, at the second state, a second sustainably greater magnetic field strength as detected by the magnetic sensor, by measuring a second magnitude of the output signal produced by the magnetic sensor, and assigning the second magnitude as a second calibration point; and (iii) determining, at the third state, a third sustainably yet greater magnetic field strength as detected by the magnetic sensor, by measuring a third magnitude of the output signal produced by the magnetic sensor, and assigning the third magnitude as a third calibration point.

In accordance with a yet further aspect, an electronic lockbox with a multifunction sensor is provided, which comprises: (a) a housing, the housing including: a bin receptacle space; and a lock that is associated with the bin receptacle space; (b) an electronic control circuit, including: a processing circuit, a memory circuit including instructions executable by the processing circuit, and an input/output interface circuit, wherein the processing circuit is in communication with at least one of the memory circuit and the input/output interface circuit; (c) a movable bin that is either locked in place at the bin receptacle space, or is in a released state so as to be removable from at least a portion of the bin receptacle space, in which the lock is under the control of the processing circuit; (d) a magnetic sensor mounted inside the housing, proximal to the bin receptacle space; (e) a first magnet mounted on the movable bin; (f) a removable magnetic cap that includes a second magnet, in which the removable magnetic cap is magnetically attachable to the first magnet; wherein: (g) the electronic lockbox exhibits three operating states, such that (i) in a first operating state; (A) the movable bin is released from the bin receptacle space, and (B) the first magnet is positioned distal from the magnetic sensor at a sufficiently far distance so that the magnetic sensor effectively does not detect the first magnet; (ii) in a second operating state: (A) the movable bin is locked in place at the bin receptacle space, and (B) the first magnet is positioned proximal to the magnetic sensor at a sufficiently close distance so that the magnetic sensor effectively detects the first magnet; (C) the removable magnetic cap is not attached to the first magnet, and the second magnet is positioned distal from the magnetic sensor at a sufficiently far distance so that the magnetic sensor effectively does not detect the second magnet; (iii) in a third operating state: (A) the movable bin is locked in place at the bin receptacle space; (B) the removable magnetic cap is magnetically attached to the first magnet; and (C) the first magnet and the removable magnetic cap are both positioned proximal to the magnetic sensor at a sufficiently close distance so that the magnetic sensor effectively detects both the first magnet and the second magnet; (h) in the first operating state, the magnetic sensor outputs a first signal having a first voltage magnitude, the first signal is communicated to at least one of the input/output interface circuit and the processing circuit, and, if the first voltage magnitude is within a predetermined first range of values, then the processing circuit determines that the first voltage magnitude indicates that the movable bin is in a released position; (i) in the second operating state, the magnetic sensor outputs the first signal having a second voltage magnitude, the first signal is communicated to at least one of the input/output interface circuit and the processing circuit, the second voltage magnitude is subtracted from one volt ("1V"), and the absolute value is taken of the subtraction result to create a first difference value, and, if the first difference value is within a predetermined second range of values, then the processing circuit determines that the first difference value indicates that the movable bin is in a locked position, and that the removable magnetic cap is not present in the movable bin; and (j) in the third operating state, the magnetic sensor outputs the first signal having a third voltage magnitude, the first signal is communicated to at least one of the input/output interface circuit and the processing circuit, the third voltage magnitude is subtracted from 1V, and the absolute value is taken of the subtraction result to create a second difference value, and, if the second difference value is within a predetermined third range of values, then the processing circuit determines that the second difference value indicates that the movable bin is in a locked position, and that the removable magnetic cap is present in the movable bin.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
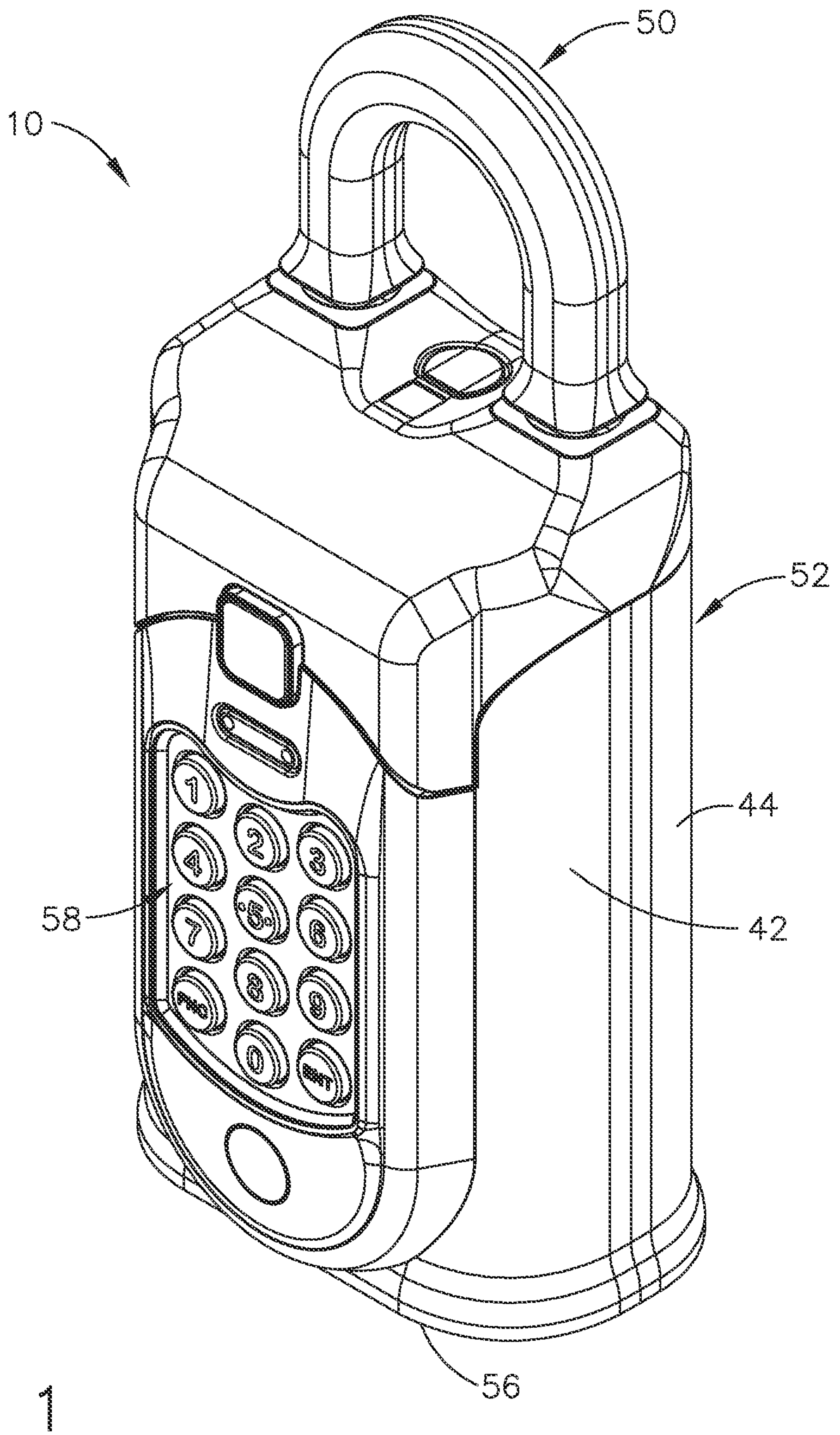
FIG. 1 is a front perspective view of the entire lockbox, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to FIG. 1, an exemplary embodiment of an electronic lockbox is generally designated by the reference numeral 10. The lockbox has an outer housing (or "enclosure" or "casing") 52, a shackle 50, and a bottom portion at 56, which is part of a movable key bin that (when installed, or "closed" as illustrated in FIG. 1) is located at the bottom portion of the outer casing 52. The upper housing of lockbox 10 includes two receptacles (openings) that receive a shackle 50. The shackle 50 has an upper portion and two shackle extensions 66, 68 (see FIG. 2) that fit through the receptacles. The front of the lockbox has a keypad 58, which can be used by a sales agent or other authorized person to enter data to the lockbox's control system.

The keypad 58 may also be referred to as a "data input circuit," in which a human user may press one or more of the keys to enter data, such as numeric information. It will be understood that future versions of electronic lockboxes may someday include a touchscreen display, and in such a design, the keypad will be incorporated directly into that display, and thus the touchscreen display itself would become the data input circuit. The keypad 58 is attached to a front portion 42 of the housing 52, while a rear portion 44 of the housing 52 is substantially planar.

As noted above, electronic lockbox 10 includes a shackle 50 that is typically used to attach the lockbox 10 to a door handle or other fixed object. Electronic lockbox 10 also includes a key compartment (e.g., a movable key bin) which typically holds a building key (e.g., such as a dwelling key—not shown in this view), and which can be accessed via a movable key bin 40. The movable key bin 40 is essentially slidable into, and out of, a receiving space at 62 (see FIGS. 13A and 13B), which will also be referred to herein as a "movable key bin receptacle," or simply a "bin receptacle," that is part of the lockbox's main body.

Figure 2:
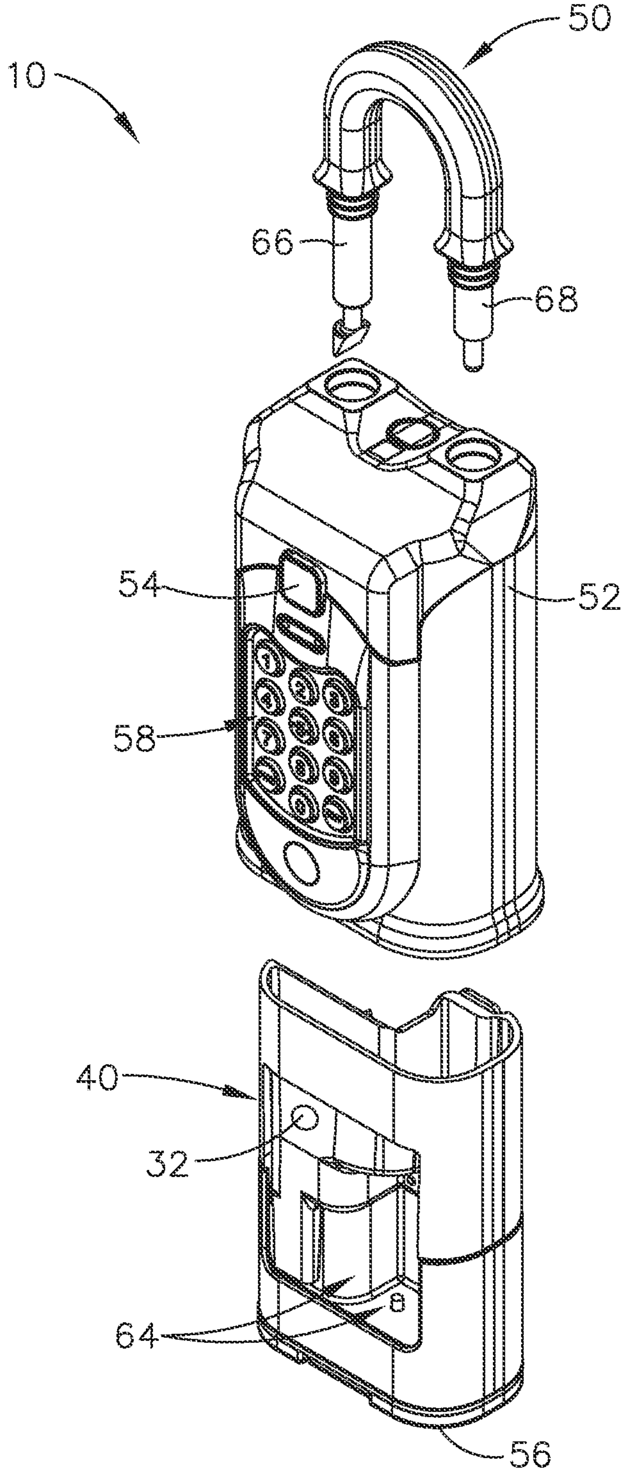
FIG. 2 is a front perspective view of the lockbox of FIG. 1 showing the shackle and key bin detached.

Referring now to FIG. 2, the electronic lockbox 10 is shown with the shackle 50 released, and the movable key bin 40 detached. It should be noted that key bin 40 is unable to completely detach as illustrated, because a retainer (not shown) only allows the movable key bin to drop down, and not fully disengage (or detach) from the lockbox 10. The key bin 40 includes a key compartment 64 (e.g., part of the movable key bin 40) that will securely hold the building key, when the key bin is inserted (into its "closed" position) into the lockbox's main body. A first magnet 32 is mounted in a recess 34 in the back wall of the key bin 40. The first magnet 32 does not necessarily completely fill the recess 34, and an outer peripheral portion of the recess 34 does not necessarily contact the first magnet 32.

Figure 3:
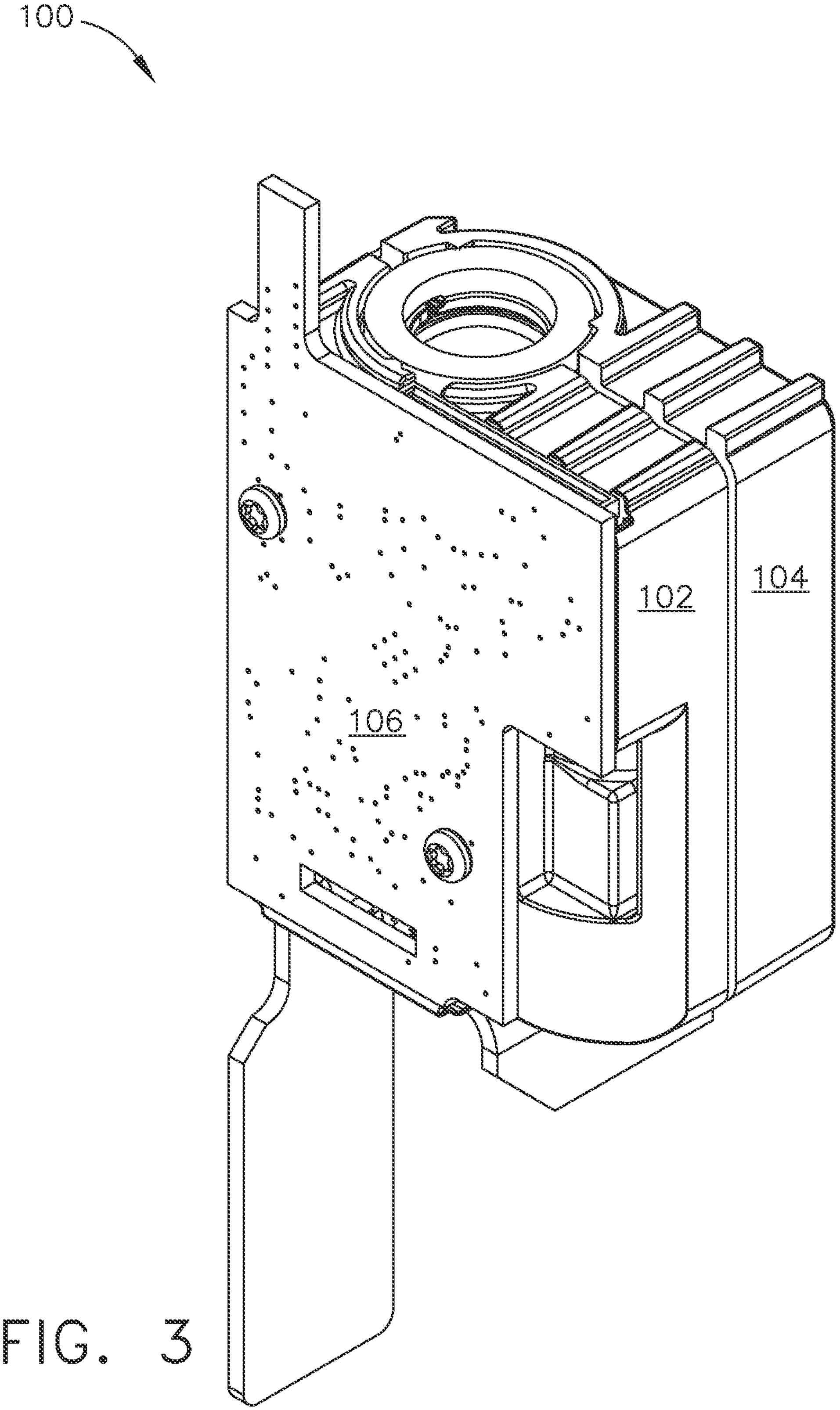
FIG. 3 is a front perspective view of the internal housing subassembly for the lockbox of FIG. 1.
Figure 4:
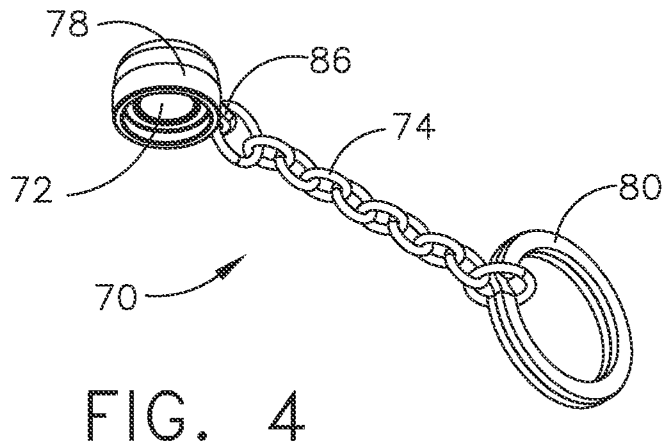
FIG. 4 is a bottom left perspective view of a key fob subassembly for use with the lockbox of FIG. 1.
Figure 5:
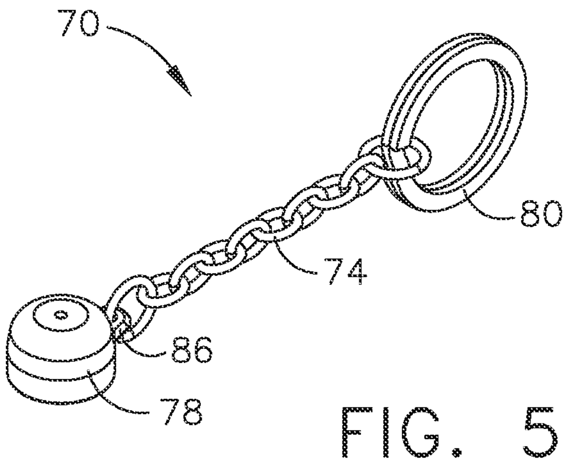
FIG. 5 is a top left perspective view of the key fob subassembly of FIG. 4.
Figure 6:
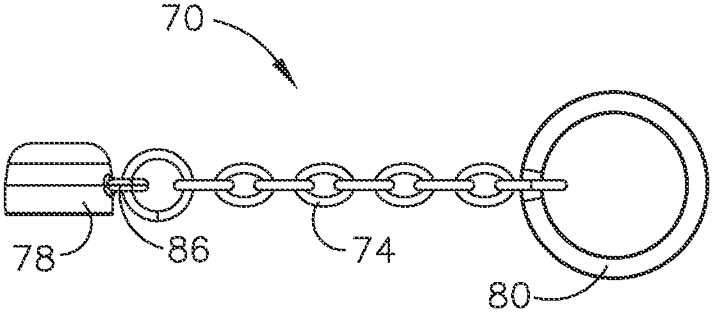
FIG. 6 is a left elevational view of the key fob subassembly of FIG. 4.

Referring now to FIG. 3, the internal housing subassembly 100 is illustrated, showing a PC board outer surface 106 of a PC board. The internal housing subassembly has two halves that are joined together, a front half housing 102, and a rear half housing 104.

It will be understood that the term "key bin" includes a "key compartment." Moreover, the structure known as the "key bin" will sometimes be referred to herein as a "movable key bin," or a "movable bin," or simply as a "bin" that is part of the overall electronic lockbox being disclosed herein. Note that the term "key fob" will be often used hereinbelow, and therefore, it will be less confusing to refer to the "key bin" as simply the "bin" or the "movable bin."

Referring now to FIGS. 4-12, a key fob sub-assembly ("key fob S/A," or simply "key fob") is shown, generally designated by the reference numeral 70. The key fob S/A 70 includes a key chain 74 having a key ring 80 on one end, and at an opposite distal end, a cover 78. A building key 76 (see FIG. 15A) will typically be attached to the key ring 80.

A cover 78 (also sometimes referred to herein as a "cap") exhibits a rounded mounting portion 86 that can be attached to the key chain 74. The cover 78 is shaped somewhat like a hollow cup, having a seat 84, and a second magnet 72 is secured at the seat 84 (see FIG. 7). The second magnet 72 sits in the seat portion 84 of the cover 78 deep enough that the cover 78 exhibits a rib (or flange) 82 around its inner circumference (see FIGS. 7-9).

Figure 7:
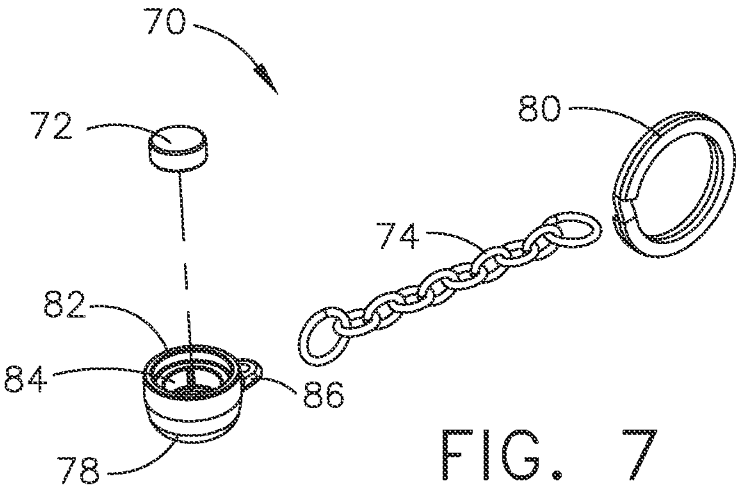
FIG. 7 is an exploded view of the key fob subassembly of FIG. 4.

FIG. 7 depicts an exploded view of the key fob 70. In this view, the seat 84 and the rib 82 are shown on the cover 78.

Figure 8:
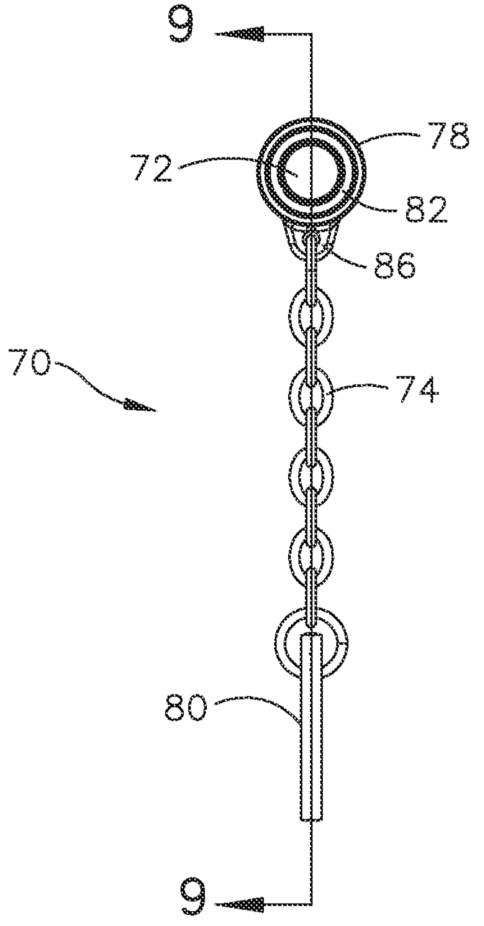
FIG. 8 is a bottom elevational view of the key fob subassembly of FIG. 4.
Figure 9:
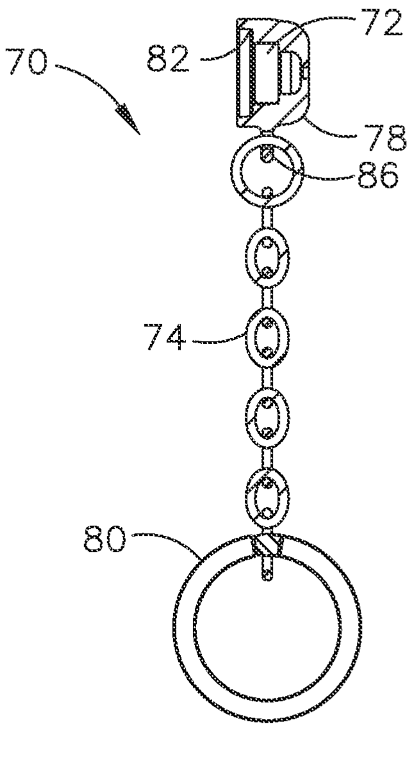
FIG. 9 is a partial left cutaway view of the key fob subassembly of FIG. 4.
Figure 10:
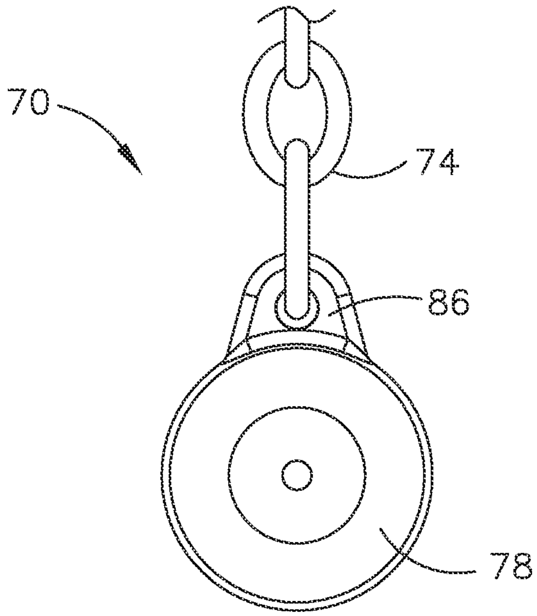
FIG. 10 is an enlarged top view of a portion of the key fob subassembly of FIG. 4, including a "top cap" portion that contains a permanent magnet.
Figure 11:
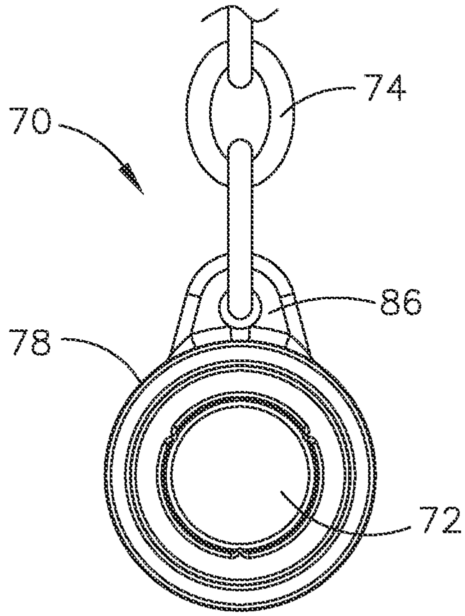
FIG. 11 is an enlarged bottom view of the "top cap" portion of the key fob subassembly of FIG. 10.
Figure 12:
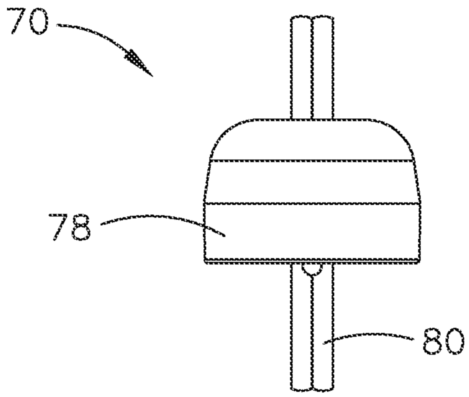
FIG. 12 is an enlarged front elevational view of the "top cap" portion of the key fob subassembly of FIG. 10.

FIG. 9 depicts a cutaway view of the key fob 70 along the line 8-8 of FIG. 8. Note that the second magnet 72 is positioned in the seat 84, and the rib (flange) 82 extends above left (in this view) and around the second magnet 72. The rib 82 fits over the recess 34 in the bin 40. The rib 82 and the recess 34 help a user "self-locate" the key fob 70 when returning a building key 76 to the lockbox 10, and the rib 82 and the recess 34 helps to line up the first magnet 32 with the second magnet 72.

It should be noted that the first and second magnets 32 and 72 are depicted as puck-shaped, and the recess 34 and the seat 74 are designed to fit puck-shaped magnets. However, it will be understood that the magnets could be of any shape, as well as the recess and seat designed to fit such shape, without departing from the principles of this technology.

The magnetic key fob 78 may also be described in other words, such as, for example, it comprises a cup-shaped magnetic cap that includes an open end that reveals a flange portion 82 and a seat portion 84, wherein the flange portion 82 is proximal to the open end and the seat portion 84 is distal from the open end; an opposite end that is substantially closed; a permanent magnet 72 that is mounted in the seat portion 84; and an attachment portion 86 that is mounted to the closed, opposite end.

It will also be understood that the first and second magnets 32 and 72 preferably are very strong permanent magnets, and thus cannot be attached to one another in reverse polarity. This means the magnetic field strength is typically additive, as perceived by a magnetic field sensor (discussed below). In a preferred embodiment, the first and second magnets are made of neodymium magnetic material, and each magnet has a magnetic field strength as high as about 13,200 Gauss.

Furthermore, the key fob 70 cannot be randomly placed inside the key compartment 64 (a part of the movable key bin 40), in just any random orientation. The bin is designed to prevent such a random key fob 70 placement. Moreover, a user could choose to attempt to place the key fob 70 inside the bin 40 without attaching it to the first magnet 32 at the recess 34, but the lockbox would essentially recognize this as an error state and the user would eventually receive an alert (see FIG. 20 and discussion below).

The correct placement of the key fob 70 in the bin 40 is directly over the recess 34 so that the second magnet 72 magnetically attaches to the first magnet 32. The recess 34 is particularly designed to easily accommodate the cover 78 to assist with "self-locating" the key fob for a user, as the key fob 70 is returned to the bin 40. The rib (flange) 82 on the cover 78 is designed to easily mount over the recess 34 so that the first and second magnets 32 and 72 easily attach together. This design is "self-locating" because a user does not have to perform precise motions or movements to correctly place the key fob 70 in the bin 40. The rib 82 and the recess 34 are designed to eliminate difficult motions for the user.

Another important feature of this lockbox design is that the key fob 70 also cannot be randomly placed into the bin receptacle space 62, without the movable key bin 40 also being in place. In other words, the key fob magnet 72 (i.e., the second magnet) cannot be placed into the lockbox in lieu of the movable bin 40 (which includes the first magnet 32) in some kind of attempt to 'fool' the magnetic sensor. For example, a rogue agent may attempt to leave the lockbox in an "open state" by placing the second magnet (with the key fob—and the building key) exposed, by not closing the movable bin 40. However, this will not be successful—the key fob is sized and shaped so as to not fit into the space where the first magnet must be located for the magnetic sensor to believe (detect) a "State 1" condition—see the flow charts and FIGS. 13A through 15B. In other words, the lockbox will not determine that a normal, 'safe' condition has been achieved, because the second magnet cannot be positioned in a way to 'pretend' to be the first magnet—even if the rogue agent actually glued the key fob into the upper area of the receptacle space 62.

Figure 13A:
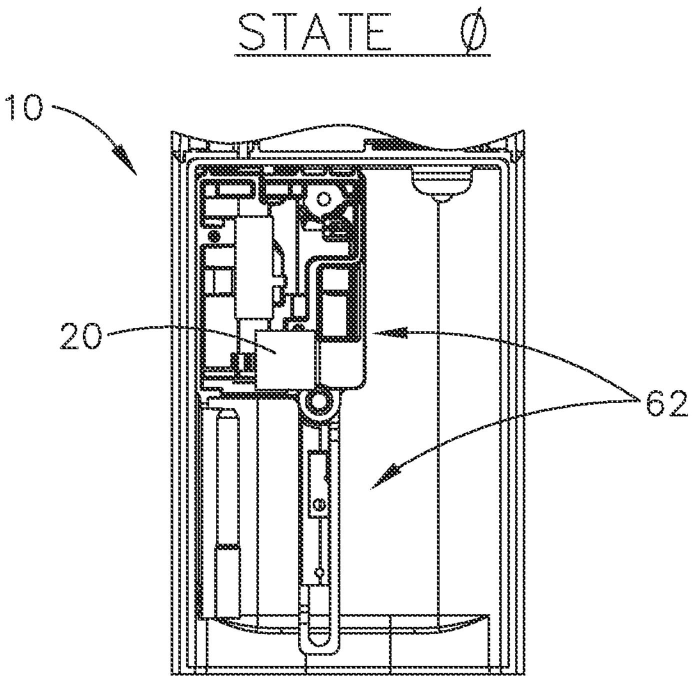
FIG. 13A is a front diagrammatic (cutaway) view of the lockbox of FIG. 1, showing the mounting position of the magnetic sensor.
Figure 13B:
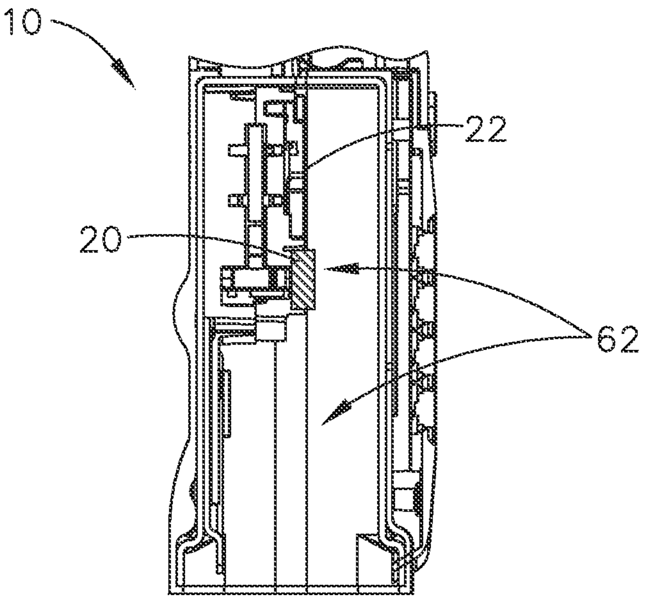
FIG. 13B is a right side diagrammatic (cutaway) view of the lockbox of FIG. 1, showing the mounting position of the magnetic sensor.

Referring now to FIGS. 13A and 13B, a "State 0" of the electronic lockbox 10 is depicted, wherein the bin 40 has dropped down and out of the (non-movable) key bin receptacle 62. It should be noted that the key bin 40 cannot physically detach from the lockbox 10 in this embodiment, but it merely extends down and out of the lockbox 10 so that a user can remove a building key 76, or replace it back into the bin 40. A magnetic sensor 20 (preferably a Hall effect sensor) is mounted on a portion of the printed circuit board 106, near the rear of a back wall portion 20 of the bin receptacle 62. In this "zero state," the output voltage of the preferred Hall effect sensor equals a minimum voltage level; i.e., Vout=$V_{MIN}$.

Figure 19:
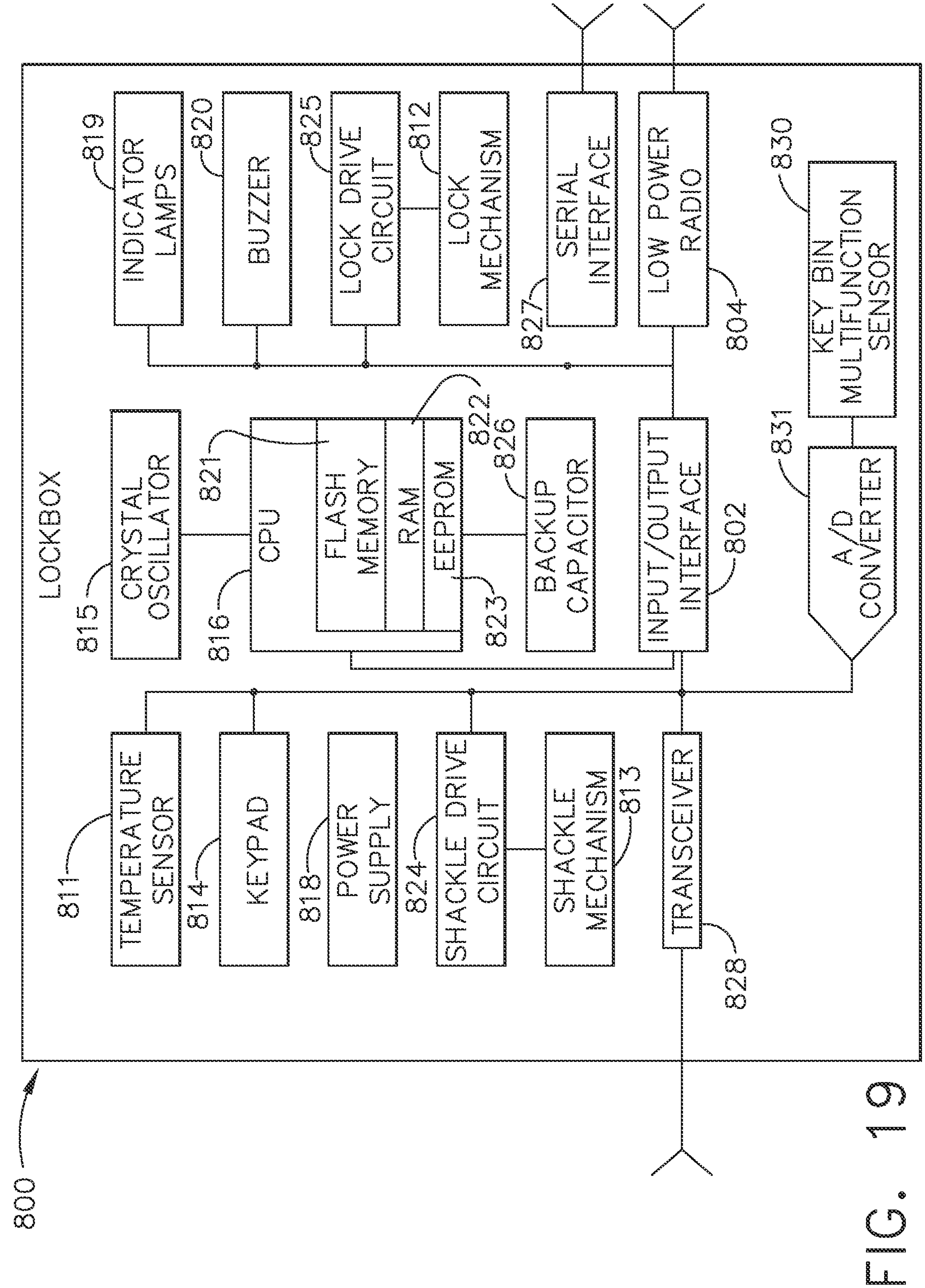
FIG. 19 is a block diagram showing some of the major hardware components of the electronic lockbox of FIG. 1.

The magnetic sensor 20 is also sometimes referred to herein, especially in FIG. 19, as a "key bin multifunction sensor 830" since it has the ability to detect the presence (or absence) of both the key bin and the key fob, using only its single sensing element. In the past, electronic lockboxes were disclosed as having two different sensors—one to detect the 'closure' of the key bin, and the other to detect the key fob (or something akin to a key fob, including some type of indicia on the building key itself). As will be discussed below in detail, the magnetic sensor 20 preferably is an analog-bipolar Hall effect sensor. Specific devices that are suitable for this sensing task include the following part numbers made by Texas Instruments: DRV5053RAQDBZR, DRV5053VAQDBZR, and DRV5053EAQDBZR. (Note: these parts are also sometimes referred to hereinbelow as the "RA variant," the "EA variant," or the "VA variant" for the magnetic sensor.)

It should be noted that the various magnetic sensor part numbers listed above each have a somewhat different magnetic sensitivity (or sensing 'polarity'). The Texas Instruments DRV5053-series includes many other specific part numbers, but the above three parts have characteristics that make them desirable, when matched with magnets that have also proven to be suitable for this lockbox design. The suitable magnets are referred to as a neodymium N42 magnet. The magnet that is mounted to the key bin that has proven suitable in tests has dimensions of about 8 mm in diameter, and about 1 mm in thickness. (This is the so-called "first magnet" 32.) The magnet that is included in the key fob is of the same material and magnetic strength, but is somewhat thicker. (This is the so-called "second magnet" 72.)

Figure 14A:
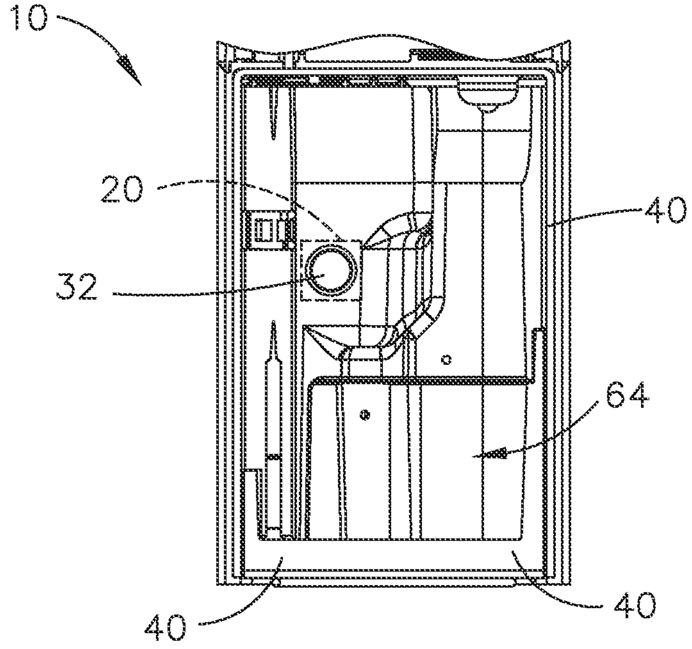
FIG. 14A is a front diagrammatic (cutaway) view of the key bin and the lockbox of FIG. 1, showing the first permanent magnet—mounted to a wall of the movable key bin—proximal to the magnetic sensor (i.e., the key bin is "closed").
Figure 14B:
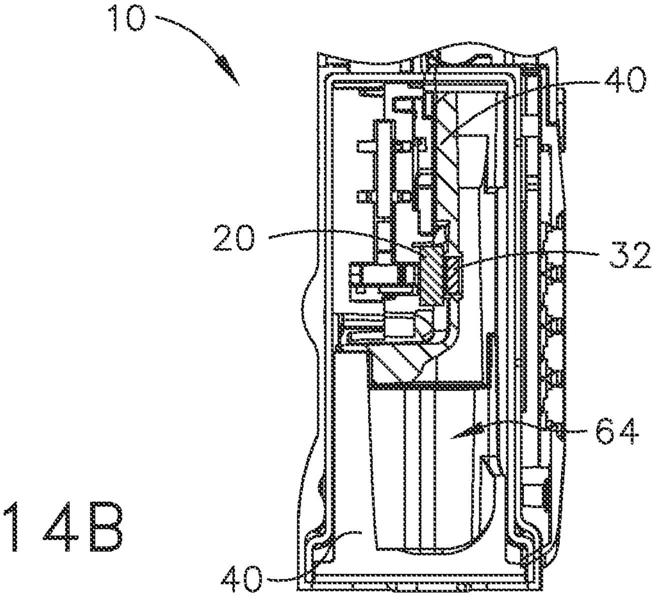
FIG. 14B is a right side diagrammatic (cutaway) view of the key bin and the lockbox of FIG. 14A, again showing the first permanent magnet proximal to the magnetic sensor (i.e., the key bin is "closed").

Referring now to FIGS. 14A and 14B, a "State 1" of the electronic lockbox 10 is depicted, wherein the bin 40 has been secured in the bin receptacle 62 without a building key 76. In this "first state," the first magnet 32 is proximal to the magnetic sensor 20, and the output voltage of the preferred Hall effect sensor equals a first voltage level; i.e., $V_{out}=V_1$.

Figure 15A:
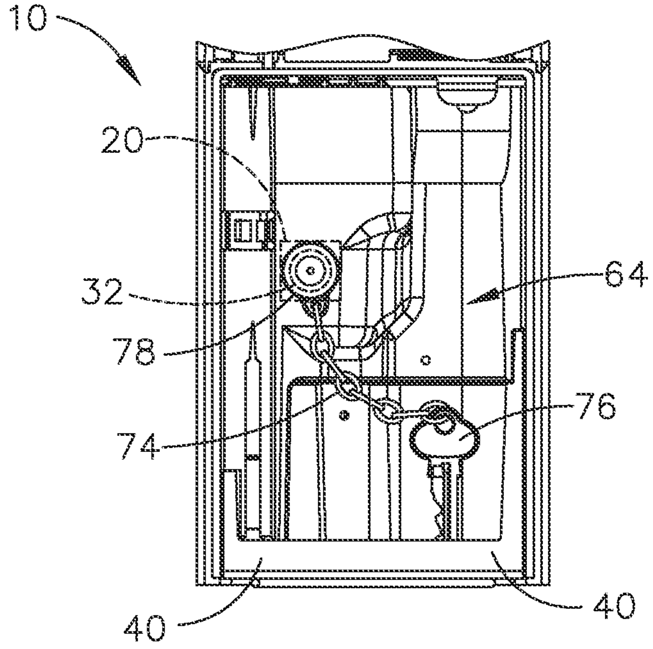
FIG. 15A is a front diagrammatic (cutaway) view of the key bin and the lockbox of FIG. 1, showing the first permanent magnet and the key fob subassembly (containing a second permanent magnet) proximal to the magnetic sensor (i.e., the key bin is "closed" and the key fob is contained therewithin).
Figure 15B:
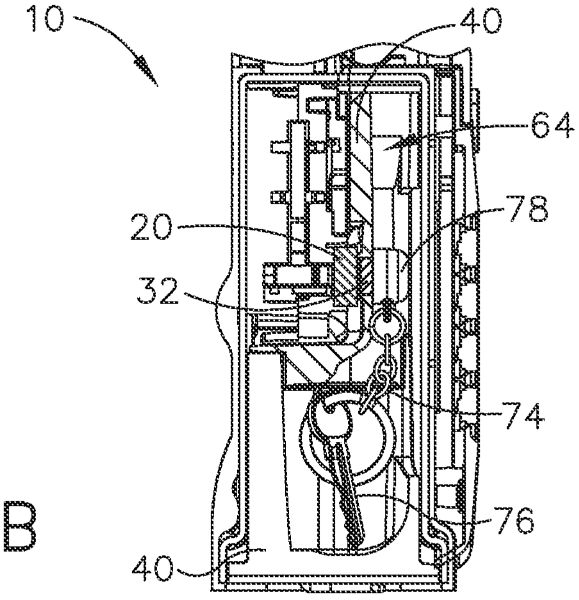
FIG. 15B is a right side diagrammatic (cutaway) view of the key bin and the lockbox of FIG. 1, showing the first permanent magnet and the key fob subassembly (containing a second permanent magnet) proximal to the magnetic sensor (i.e., the key bin is "closed" and the key fob is contained therewithin).

Referring now to FIGS. 15A and 15B, a "State 2" of the electronic lockbox 10 is depicted, wherein the bin 40 has been secured in the bin receptacle 62 along with a building key 76. In this "second state," the first magnet 32 and the second magnet 72 are both proximal to the magnetic sensor 20, and the output voltage of the preferred Hall effect sensor equals a second voltage level; i.e., $V_{out}=V_2$. It will be understood that this $V_2$ level is the highest of the three voltage output levels, whereas $V_1$ is somewhere in between $V_{MIN}$ and $V_2$. The importance of these three voltage output levels is discussed further below.

Figure 16:
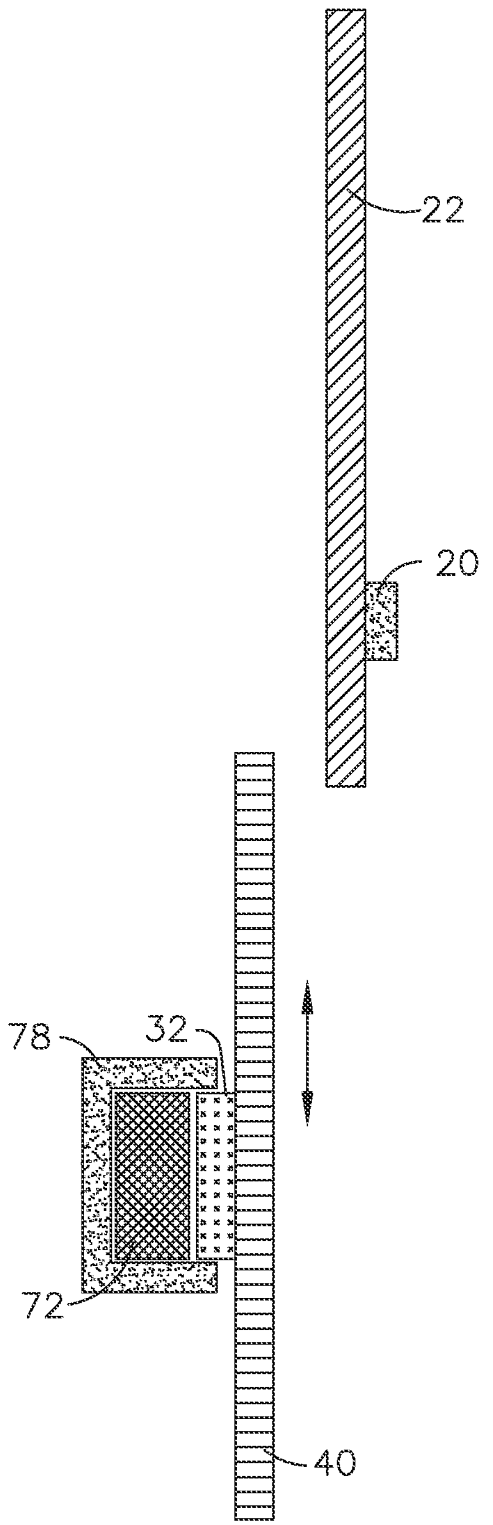
FIG. 16 is a diagrammatic view of a portion of the lockbox of FIG. 1, showing the physical relationship of the proximity between the magnetic sensor and the first magnet and the key fob subassembly (which includes a second magnet) when the key bin is moved to and from its closed position.

Referring now to FIG. 16, a diagrammatic view of the electronic lockbox 10 is depicted, showing the physical relationship between the magnetic sensor 20, the first magnet 32, and the second magnet 72. The bin 40 is shown here in an "open" position, in which a user can physically access the building key 76. In the open position, the first and second magnets 32 and 72 are distal from the magnetic sensor 20, such that the sensor 20 effectively cannot detect their presence, and thus produces the $V_{MIN}$ output voltage (as discussed above).

Using this configuration depicted in FIG. 16, When the bin 40 is moved to a "closed" position, the first and second magnets 32 and 72 are moved proximal to the magnetic sensor 20. In the closed position with the building key 76 thus attached, the magnetic sensor 20 then produces the highest level output, or $V_2$ (as discussed above).

It should be understood that the bin 40 is constructed of material that does not interfere with the magnetic sensor's 20 ability to read the first magnet 32 or the second magnet 72 when they are positioned proximal to the sensor. As a first option, the bin 40 can be constructed of multiple materials, yet retaining structural strength and integrity to resist attack. For example, a lower portion of the bin 40 can be constructed of steel (or similar material), and an upper portion of the bin 40 (proximal to the magnetic sensor 20) can be constructed of a hard plastic (or similar material). In this way, the lower portion of the bin 40 is hard enough to resist physical attack, and the upper portion, while still sufficiently hard (or stiff), will not block the magnetic sensor's 20 ability to detect the magnetic field strength of those first and second magnets (32 and 72).

Another option is to create an opening in the upper portion of the movable bin somewhat proximal to the magnetic sensor 20 (when the bin is installed into the lockbox). In this way, the bin can be constructed of a single material (such as steel, for example), and the magnetic sensor 20 would still be able to detect most of the magnetic field strength of the first and second magnets. Yet another option would be to create a window in the upper portion of the movable bin 40, again proximal to the magnetic sensor 20 when the bin is installed. The window would be made of a non-magnetic material (e.g., plastic), while the remainder of the movable bin could be made of steel, if desired.

Figure 17:
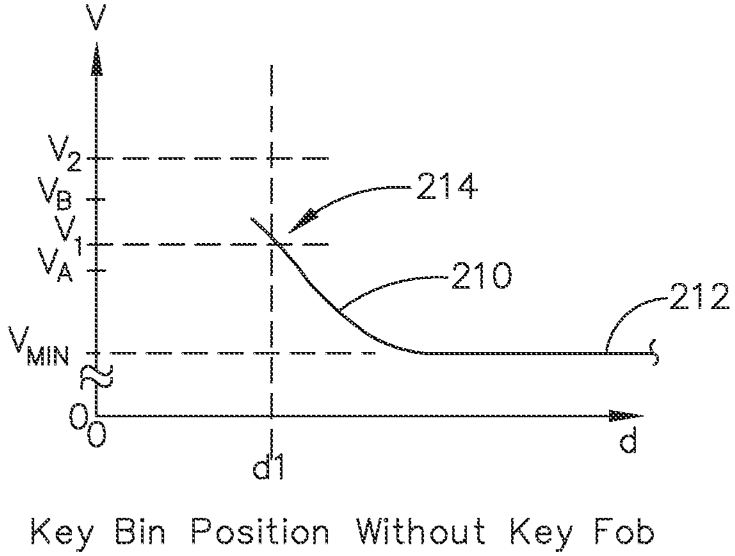
FIG. 17 is a graph showing the voltage output of the magnetic sensor of a first type ("forward polarity response") vs. the key bin position, without the key fob subassembly, of the electronic lockbox of FIG. 1.

Referring now to FIG. 17, a graph showing the voltage output of the magnetic sensor vs. the key bin position without the key fob is depicted. In FIG. 17, the X-axis is labeled by a reference "d," which represent the bin's 40 distance (i.e., the first magnet's distance) from the magnetic sensor 20, and the Y-axis is labeled by a reference "v," which indicates the magnetic sensor's 20 output voltage. The "d1" reference line indicates a nominal distance to the first magnet 32 when the bin 40 is closed.

The $V_{MIN}$ reference line indicates the magnetic sensor's 20 output voltage when the bin 40 is open (as discussed above). The $V_A$ reference mark indicates a (predetermined) minimum threshold value that represents "State 1," which means that the sensor should be detecting a status in which the movable bin 40 is closed without the key fob 70 inside. (This $V_A$ value would be used to detect a relatively 'weak' permanent magnet 32, but one that is still within specification for use in this lockbox engineering application.) The $V_1$ reference indicates a nominal (typically expected) magnetic sensor 20 output voltage when the bin 40 is closed without the key fob 70 (as discussed above).

The $V_B$ reference indicates a (predetermined) minimum threshold value that represents "State 2," which means that the sensor should be detecting a status in which the movable bin 40 is closed and the key fob 70 is present. (This $V_B$ value would be used to detect a relatively 'weak' permanent magnet 32 and/or a relatively 'weak' permanent magnet 72, but ones that are still within specification for use in this lockbox engineering application.) The $V_2$ reference indicates a nominal (typically expected) magnetic sensor 20 output voltage when the bin 40 is closed and the key fob 70 is present.

When the bin 40 is in the open position, the voltage output of the magnetic sensor 20 is depicted on FIG. 17 at a reference numeral 212. (Note: this example is for a 'forward polarity' set of magnets, and a 'forward polarity response' sensor (e.g., the "RA" variant magnetic sensor.) At this position 212, the actual distance "d" is at its maximum, and the voltage output $V_{MIN}$ is at a minimum voltage level. As a user moves the bin 40 from the open position toward the closed position, the sensor's output voltage "v" begins to increase. This increasing voltage is shown at a reference numeral 210. As the bin 40 gets yet closer to the magnetic sensor 20, the output voltage still continues to increase. Once the bin 40 has arrived at the closed position, the voltage output will be at a higher level than the previous positions 210 and 212, as shown at a reference numeral 214. At this position 214, the distance between the first magnet 32 and the magnetic sensor 20 is at d1 (i.e., the nominal distance, noted above), and the voltage "v" is at $V_1$ which is the nominal output voltage when the bin 40 is closed without the key fob 70. Of course, when the key fob 70 is present, the nominal voltage levels change, as depicted on FIG. 18.

Figure 18:
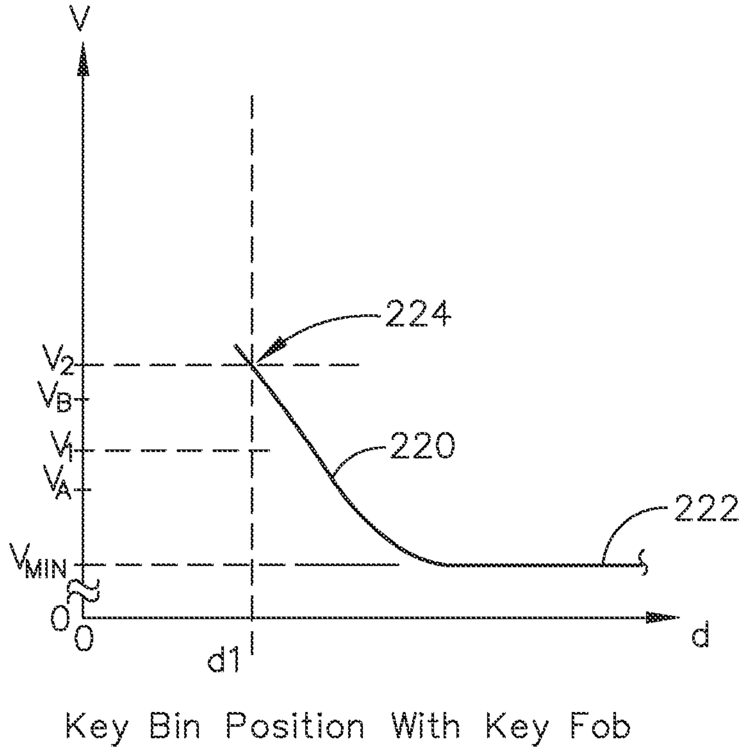
FIG. 18 is a graph showing the voltage output of the first type magnetic sensor vs. the key bin position, with the key fob subassembly in place, of the electronic lockbox of FIG. 1.

Referring now to FIG. 18, a graph showing the voltage output of the magnetic sensor vs. the key bin position with the key fob present is illustrated. In FIG. 18, the X-axis is again labeled by a reference "d," which indicates the bin's 40 (i.e., the first magnet's 32, and essentially the second magnet's 72) varying distance from the magnetic sensor 20, and the Y-axis is labeled by a reference "v," which indicates the magnetic sensor's 20 varying output voltage. The "d1" reference line indicates a nominal distance between the first magnet 32 and the sensor 20 when the bin 40 is closed.

The $V_{MIN}$ reference line indicates the magnetic sensor's 20 output voltage when the bin 40 is open (as discussed above). The $V_A$ reference mark has the same meaning as before, in connection with FIG. 17 (indicating a first minimum threshold value). The $V_1$ reference again indicates a nominal (typically expected) magnetic sensor 20 output voltage when the bin 40 is closed without the key fob 70 (as discussed above). The $V_B$ reference mark has the same meaning as before, in connection with FIG. 17 (indicating a second minimum threshold value, this time with the key fob 70 present). The $V_2$ reference again indicates a nominal (typically expected) magnetic sensor 20 output voltage when the bin 40 is closed and the key fob 70 is present.

When the bin 40 is in the open position, the voltage output of the magnetic sensor 20 is depicted at a reference numeral 222. At this position 222, the distance d1 is at its maximum, and the voltage output $V_{MIN}$ is at a minimum voltage level. Note that in this position 222, the magnetic sensor 20 outputs the same voltage level ($V_{MIN}$) as in position 212 in FIG. 17. As a user moves the bin 40 from the open position toward the closed position, the voltage output begins to increase, except that in FIG. 18 the increase is greater than in FIG. 17, due to the additional magnetic field strength generated by the presence of both the first and second magnets 32 and 72. This increased voltage is shown at a reference numeral 220. As the bin 40 gets yet closer to the magnetic sensor 20, the voltage still continues to increase. Once the bin 40 has arrived at the closed position, the voltage output will be at a higher level than the previous position 214 (on FIG. 17), as shown at a reference numeral 224. Note that the slope 220 and position 224 indicate a greater voltage output than the slope 210 and position 214 in FIG. 17; this is due to the additional presence of the second magnet 72. At this position 224, the distance between the first magnet 32 and the magnetic sensor 20 is at d1 (i.e., the same nominal distance), and the voltage is at $V_2$ which is the nominal output voltage when the bin 40 is closed with the key fob 70 present.

Figure 22:
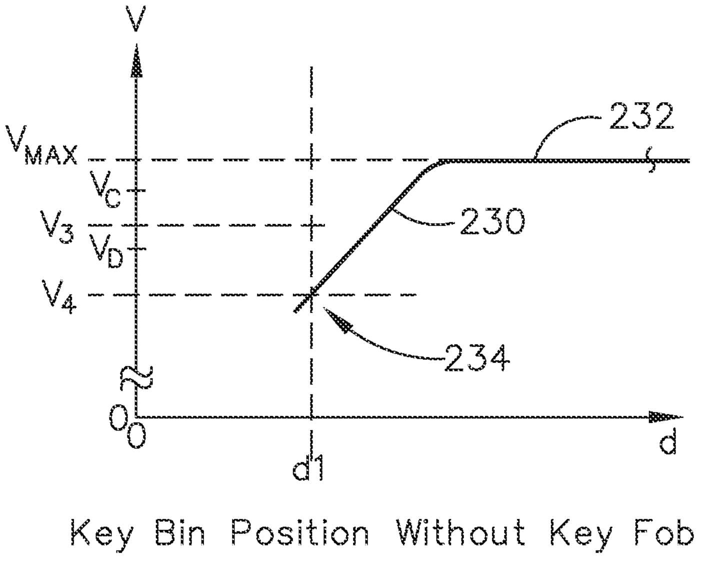
FIG. 22 is a graph showing the voltage output of the magnetic sensor of a second type ("reverse polarity response") vs. the key bin position, without the key fob subassembly, of the electronic lockbox of FIG. 1.
Figure 23:
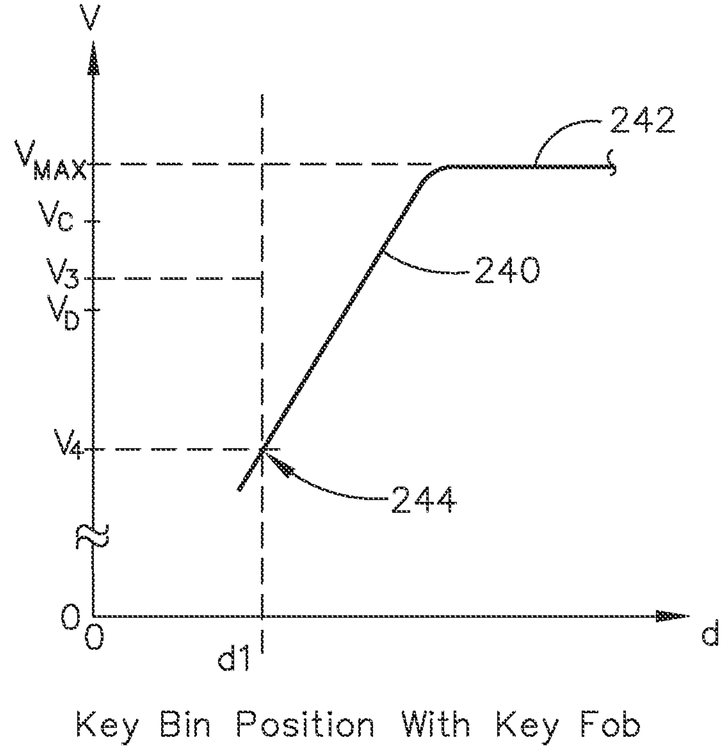
FIG. 23 is a graph showing the voltage output of the second type magnetic sensor vs. the key bin position, with the key fob subassembly in place, of the electronic lockbox of FIG. 1.

The examples discussed above in reference to FIGS. 17 and 18 were for "forward polarity" of both the magnets and the type (variant) of magnetic sensor. If, for example, a "reverse polarity response" type of sensor is used in the lockbox, such as the "EA variant" type of sensor, then the graphs will have a different appearance. FIGS. 22 and 23 show examples of the "reverse polarity response" situation.

Referring now to FIG. 22, a graph showing the voltage output of the magnetic sensor vs. the key bin position without the key fob is depicted. In FIG. 22, the X-axis is labeled by a reference "d," which represent the bin's 40 distance (i.e., the first magnet's distance) from the magnetic sensor 20, and the Y-axis is labeled by a reference "v," which indicates the magnetic sensor's 20 output voltage. The "d1" reference line indicates a nominal distance to the first magnet 32 when the bin 40 is closed.

The $V_{MAX}$ reference line indicates the magnetic sensor's 20 output voltage when the bin 40 is open (as discussed above). The $V_C$ reference mark indicates a (predetermined) maximum threshold value that represents "State 1," which means that the sensor should be detecting a status in which the movable bin 40 is closed without the key fob 70 inside. (This $V_C$ value would be used to detect a relatively 'weak' permanent magnet 32, but one that is still within specification for use in this lockbox engineering application.) The $V_3$ reference indicates a nominal (typically expected) magnetic sensor 20 output voltage when the bin 40 is closed without the key fob 70 (as discussed above).

The $V_D$ reference indicates a (predetermined) minimum threshold value that represents "State 2," which means that the sensor should be detecting a status in which the movable bin 40 is closed and the key fob 70 is present. (This $V_D$ value would be used to detect a relatively 'weak' permanent magnet 32 and/or a relatively 'weak' permanent magnet 72, but ones that are still within specification for use in this lockbox engineering application.) The $V_4$ reference indicates a nominal (typically expected) magnetic sensor 20 output voltage when the bin 40 is closed and the key fob 70 is present.

When the bin 40 is in the open position, the voltage output of the magnetic sensor 20 is depicted on FIG. 22 at a reference numeral 232. (Note again: this example is for a 'reverse polarity response' sensor (e.g., the "EA" variant magnetic sensor.) At this position 232, the actual distance "d" is at its maximum, and the voltage output V is at a maximum voltage level $V_{MAX}$. As a user moves the bin 40 from the open position toward the closed position, the sensor's output voltage "v" begins to decrease. This decreasing voltage is shown at a reference numeral 230. As the bin 40 gets yet closer to the magnetic sensor 20, the output voltage still continues to decrease. Once the bin 40 has arrived at the closed position, the voltage output will be at a lower level than the previous positions 230 and 232, as shown at a reference numeral 234. At this position 234, the distance between the first magnet 32 and the magnetic sensor 20 is at d1 (i.e., the nominal distance, noted above), and the voltage "v" is at $V_3$ which is the nominal output voltage when the bin 40 is closed without the key fob 70. Of course, when the key fob 70 is present, the nominal voltage levels change, as depicted on FIG. 23.

Referring now to FIG. 23, a graph showing the voltage output of the magnetic sensor vs. the key bin position with the key fob present is illustrated. In FIG. 23, the X-axis is again labeled by a reference "d," which indicates the bin's 40 (i.e., the first magnet's 32, and essentially the second magnet's 72) varying distance from the magnetic sensor 20, and the Y-axis is labeled by a reference "v," which indicates the magnetic sensor's 20 varying output voltage. The "d1" reference line indicates a nominal distance between the first magnet 32 and the sensor 20 when the bin 40 is closed.

The $V_{MAX}$ reference line indicates the magnetic sensor's 20 output voltage when the bin 40 is open (as discussed above). The $V_C$ reference mark has the same meaning as before, in connection with FIG. 22 (indicating a first maximum threshold value). The $V_3$ reference again indicates a nominal (typically expected) magnetic sensor 20 output voltage when the bin 40 is closed without the key fob 70 (as discussed above). The $V_D$ reference mark has the same meaning as before, in connection with FIG. 22 (indicating a second maximum threshold value, this time with the key fob 70 present). The $V_4$ reference again indicates a nominal (typically expected) magnetic sensor 20 output voltage when the bin 40 is closed and the key fob 70 is present.

When the bin 40 is in the open position, the voltage output of the magnetic sensor 20 is depicted at a reference numeral 242. At this position 242, the distance d1 is at its maximum, and the voltage output $V_{MAX}$ is at a maximum voltage level $V_{MAX}$ Note that in this position 242, the magnetic sensor 20 outputs the same voltage level ($V_{MAX}$) as in position 232 in FIG. 22. As a user moves the bin 40 from the open position toward the closed position, the voltage output begins to decrease, except that in FIG. 23 the decrease is greater than in FIG. 22, due to the additional magnetic field strength generated by the presence of both the first and second magnets 32 and 72. This decreased voltage is shown at a reference numeral 240. As the bin 40 gets yet closer to the magnetic sensor 20, the voltage still continues to decrease. Once the bin 40 has arrived at the closed position, the voltage output will be at a lower level than the previous position 234 (on FIG. 22), as shown at a reference numeral 244. Note that the slope 240 and position 244 indicate a lesser voltage output than the slope 230 and position 234 in FIG. 22; this is due to the additional presence of the second magnet 72. At this position 244, the distance between the first magnet 32 and the magnetic sensor 20 is at d1 (i.e., the same nominal distance), and the voltage is at $V_4$ which is the nominal output voltage when the bin 40 is closed with the key fob 70 present.

Referring now to FIG. 19, an electronic lockbox design is provided in a block diagram, which shows many of the major electronic components, generally designated by the reference numeral 10. Most of the components listed in this block diagram are also found in the earlier versions of electronic lockboxes sold by SentriLock, LLC of Cincinnati, Ohio. A brief description of these components follows.

Electronic lockbox 10 includes a microprocessor (CPU) 816, FLASH memory 821, random access memory (RAM) 822, EEPROM (electrically erasable programmable read only memory) 823, a battery (or other electrical power supply) 818, an (optional) memory backup capacitor 826, indicator LED lamps 819, a piezo buzzer 820, a crystal oscillator 815, a digital temperature sensor 811 (these last two devices can be combined into a single chip) a shackle drive circuit 824, a shackle release mechanism 813, a key compartment (key bin) mechanism drive circuit 825, a key compartment (key bin) lock/release mechanism 812, and a membrane style keypad 814 for user data entry.

A serial interface 827 is also included so that the CPU 816 is able to communicate with other external devices, such as a separate portable computer in the form of a PDA (personal digital assistant) or a tablet computer, or other type of portable computing device that uses a serial data link. For example, serial interface 827 can comprise an infrared (IR) port that communicates with a standard IR port found on many PDA's; or it could use a different communications protocol, such as Bluetooth. A low power radio 804 is included for communications with a portable electronic key (not shown on FIG. 4). This radio 804 could have any number of types of communications protocols, including one that allows the lockbox 10 to exchange data with an electronic key in the form of a smart phone. A special software application program (an "APP") would run on the smart phone, to allow it to communicate with lockbox 10.

The microprocessor 816 controls the operation of the electronic lockbox 10 according to programmed instructions (electronic lockbox control software) stored in a memory device, such as in FLASH memory 821. The RAM memory 822 is typically used to store various data elements such as counters, software variables and other informational data. EEPROM memory 823 is typically used to store more permanent electronic lockbox data such as serial number, configuration information, and other important data. It will be understood that many different types of microprocessors or microcontrollers could be used in the electronic lockbox 10, and that many different types of memory devices could be used to store data in both volatile and non-volatile form, without departing from the principles of this technology. In one mode of an exemplary embodiment, the electronic lockbox CPU 816 is a Texas Instruments part number CC2652R SimpleLink™ 2.4 GHz Wireless microcontroller that incorporates RAM 822, FLASH memory 821 and EEPROM memory 823 internally (as on-board memory). It will be understood that any comparable microcontroller could instead be used, along with the appropriate software written for that specific device.

Battery 818 provides the operating electrical power for the electronic lockbox. If used, the optional backup capacitor 826 is used to provide temporary memory retention power during replacement of battery 818. It will be understood that an alternative electrical power supply could be used if desired, such as a solar panel with the memory backup capacitor.

An input/output (I/O) interface circuit 802 is provided so the microprocessor 816 can exchange data and operational signals with external devices, or with integral devices to the lockbox that require greater power than can be directly supplied by the microprocessor's pinouts. This puts the I/O circuit 802 in the pathway for virtually all signals that are used in the controlling of lockbox 10, including the data signals that are involved with the serial interface 827, and the low power radio 804.

Electronic lockbox 10 generally includes a shackle (see item 50 on FIG. 1) that is typically used to attach the lockbox 10 to a door handle or other fixed object. However, it should be noted that stationary versions of electronic lockboxes are now available that are permanently affixed to buildings, or another large object, and such stationary versions do not always require a shackle.

Electronic lockbox 10 also includes a key compartment which typically holds a dwelling key (not shown in FIG. 2), and which can be accessed via the movable bin 40. The bin's lock and release mechanism 812 uses a motor mechanism (not shown) that is controlled by drive circuit 825 that in turn is controlled by CPU 816. Shackle release mechanism 813 also uses a motor, which is controlled by drive circuit 824 that in turn is controlled by CPU 816. It will be understood that the release or locking mechanisms used for the shackle and movable key bin can be constructed of many different types of mechanical or electromechanical devices without departing from the principles of the technology disclosed herein. It will also be understood that, in some physical locations, the lockbox may not require certain components that have been described above; for example, in some circumstances, a lockbox may not require a shackle. The crystal oscillator 815 provides a steady or near-constant frequency clock signal to CPU 816's asynchronous timer logic circuit.

In one embodiment, the digital temperature sensor 811 is read at regular intervals by the electronic lockbox CPU 816 to determine the ambient temperature. Crystal oscillator 815 may exhibit a small change in oscillating characteristics as its ambient temperature changes. In one type of crystal oscillator device, the oscillation frequency drift follows a known parabolic curve around a 25 degrees C. center. The temperature measurements are used by CPU 816 in calculating the drift of crystal oscillator 815 and thus compensating for the drift and allowing precise timing measurement regardless of electronic lockbox operating environment temperature. As noted above, a single chip can be used to replace the combination of crystal oscillator 815 and temperature sensor 811, such as a part number DS32KHZ manufactured by Dallas Semiconductor.

LED indicator lamps 819 and a piezo buzzer 820 are included to provide both an audible and a visual feedback of operational status of the electronic lockbox 10. Their specific uses are described in detail in other patent documents by the same inventor. If used, the backup capacitor 826 is charged by battery 818 (or perhaps by another power source) during normal operation.

The lockbox 10 can also be optionally equipped with a transceiver 828 that works with near field communications ("NFC") equipment, and perhaps could be used to detect RFID chips, for example. In addition, such NFC circuits may be used for communicating with many other electronic products that have become common at many commercial establishments; so much so that most new smart phones are equipped with such an NFC transceiver (which typically includes a low-power microcontroller circuit).

The electronic lockbox 10 also includes a key bin multifunction sensor 20 and an A/D (analog-to-digital) converter 831 (also sometimes referred to herein as an "ADC"). As discussed above, the key bin multifunction sensor 20 is preferably a Hall effect sensor, such as a Texas Instruments DRV5053-series Analog-Bipolar Hall Effect Sensor, for example; but it will be understood that any comparable magnetic field sensor could instead be used. The key bin multifunction sensor 20 (item #830 on FIG. 19) can detect different magnetic field levels (discussed below), and then translates that into a variable analog output voltage. The A/D converter 831, periodically reads (samples) these different analog voltage levels, and periodically the sampled output signals from the ADC (as digital numeric values) are read to the CPU 816 (discussed below).

It should be noted that the A/D converter 831 could be a separate electronic device (essentially as depicted in the block diagram of FIG. 19) that has its digital output read by the microcontroller 816 as needed, or the microcontroller could include its own on-board A/D converter, basically performing in the same manner—i.e., the processing unit of such a microcontroller would periodically read the digital output of the on-board A/D converter. In the second (above) example, the microcontroller would be a powerful "all-in-one" type of electronic component, and would encompass at least the components 816, 821, 822, 823, and 831 that are illustrated on FIG. 19. Such a powerful device may well include the serial interface circuit 827 and the low power radio circuit 804.

Figure 20:
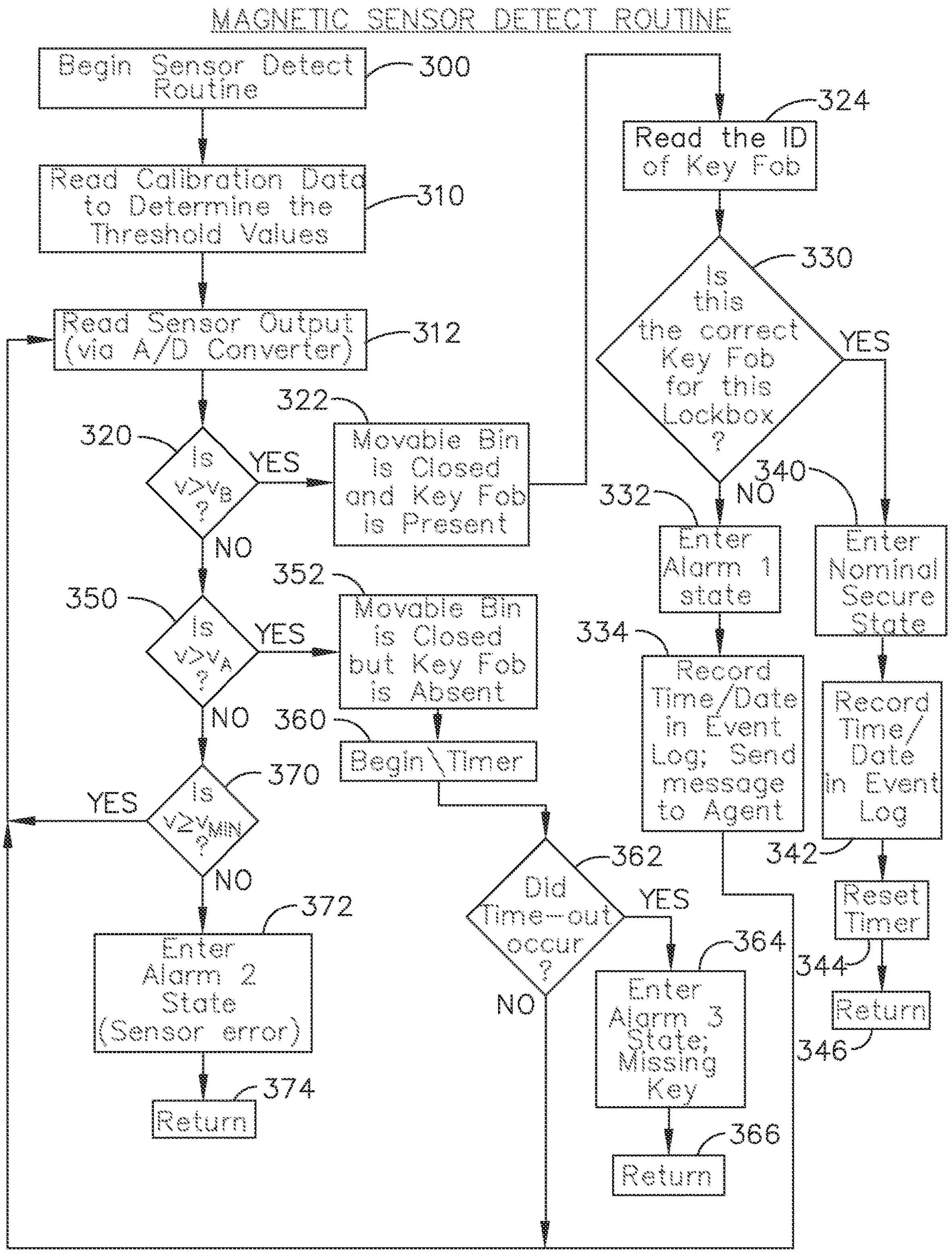
FIG. 20 is a flow chart of certain functions performed during a "Magnetic Sensor Detect Routine" for a first embodiment 'general case,' as used in the electronic lockbox of FIG. 1.

Referring now to FIG. 20, a flow chart for a "Magnetic Sensor Detect Routine" is depicted. This flow chart is for a first embodiment 'general case' routine; a more specific second embodiment routine is described below, in connection with FIG. 24. And note: this example routine is for a "forward polarity response" magnetic sensor, as discussed above.

This general case routine begins with an initialization function (for this routine) at 300, and continues at a function 310, wherein calibration data is read to determine the (predetermined) threshold values of the magnetic sensor 20. Next, at a function 312, the ADC 831 reads the magnetic sensor's 20 output voltage "v". Then, at an operational decision 320, the system controller determines if the voltage "v" is greater than the threshold voltage $V_B$. If v is greater than $V_B$, then at a function 322 the system determines that the bin 40 is closed and the key fob 70 is present. However, if v is less than $V_B$, then the system logic continues to the next operational decision (at 350).

At an operational decision 350, the system controller determines if the voltage "v" is greater than the threshold voltage $V_A$. If v is greater than $V_A$, then at a function 352 the system controller determines that the bin 40 is closed but the key fob 70 is absent. However, if v is less than $V_A$, then the system logic continues to the next operational decision (at 370).

At an operational decision 370, the system controller determines if the voltage "v" is greater than the voltage $V_{MIN}$. If v is greater than $V_{MAX}$, then the logic flow returns to the function 312, where all the voltage thresholds are again tested by reading the output voltage of the A/C converter. However, if v is less than $V_{MAX}$, then at a function 372 an "Alarm2" state is entered, which indicates a sensor error. Then at a function 374, the system returns to other programmed functions.

Returning to function 352, once the system controller determines that the bin is closed and the key fob 70 is absent, then at a function 360 a 'software' timer begins. Then, at an operational decision 362, the routine queries if a time-out has occurred. If not, then the routine returns to the function 312 (to read the A/D converter's output). However, if a time-out did occur, then at a function 364 an "Alarm3" state is entered, which indicates a missing building key 76. Then, at a function 366 the system returns to other programmed functions.

Returning to function 322, once the system controller determines that the bin is closed and the key fob 70 is present, then as an optional feature, at a function 324 the ID of the key fob 70 is read by a key fob identity detector 832. (Note, the system could be designed to determine the identity of the key fob, or of the building key—or both-depending on the choices made by the overall lockbox system designer.) Then, continuing as part of this optional feature, at an operational decision 330, the routine queries if this is the correct key fob 70 for this particular electronic lockbox. If it is not, then at a function 332 an "Alarm1" state is entered. Then, at a function 334, the system records the time and date (and status) in the event log, and sends a message to the appropriate party (preferably the listing agent or the listing agent's realtor board). The routine then returns at a function 312 to other programmed functions.

Returning to operational decision 330, if the correct key fob 70 is detected, then at a function 340 a "Nominal Secure" state is entered. Next, at a function 342, the system records the time and date (and status) in the event log. At a function 344 the timer is reset, and finally at a function 346 the system returns to normal other programmed functions.

The detection methodology for determining if the correct key fob S/A 70 has been returned to the lockbox is relatively well-known in the conventional prior art, including descriptions for doing so found in other U.S. patents owned by the Applicant, SentriLock, LLC. For example, the key fob 70 could include an RFID chip as an "I.D. tag", much like what stores use to protect their merchandise from being unlawfully removed from their premises. If an RFID chip is used as the identifying device, then an RFID detector would be used as the typical sensor (using near field communications) for determining whether or not the correct key fob S/A has been returned to the key bin of the lockbox.

It will be understood that, once a particular lockbox 10 (or 800) is installed at a property to be protected, after the lockbox has been opened to enable access to the building key that is contained in the movable bin 40, that lockbox will quickly and repeatedly perform the Magnetic Sensor Detect Routine of FIG. 20, essentially forever if desired, until the key fob is returned and the movable bin is re-installed (closed). This routine will become an important overall function of such lockboxes, once they become available to the authorized users (e.g., real estate agents). As noted above, the embodiment described herein provides a relatively simple-to-use, and almost foolproof way, using only a single sensor, of accomplishing two important functions: detecting a closure of the lockbox movable bin, and detecting the return of the key fob that is attached to the building key.

Figure 21:
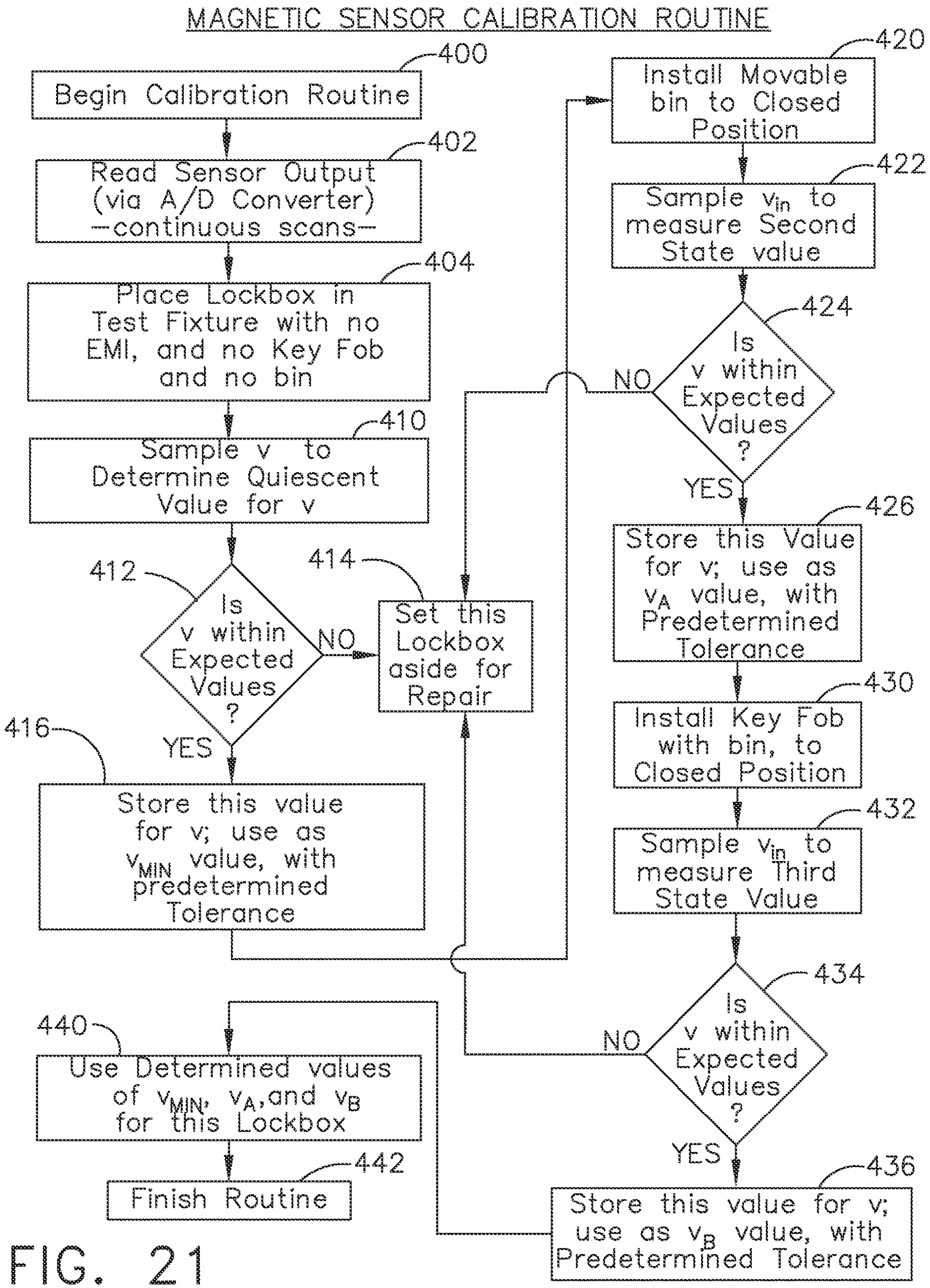
FIG. 21 is a flow chart of certain functions performed during a "Magnetic Sensor Calibration Routine" for a first embodiment 'general case,' as used in the electronic lockbox of FIG. 1.

Referring now to FIG. 21, a flow chart for a "Magnetic Sensor Calibration Routine" is depicted. This flow chart is for a first embodiment 'general case' calibration routine; a more specific second embodiment routine is described below, in connection with FIG. 25. And note: this example routine is for a "forward polarity response" magnetic sensor, as discussed above. The routine begins with an initialization function for this routine at 400. Next, at a function 402, the system controller reads the magnetic sensor's 20 output voltage. This reading occurs using continuous scans of the sensor's output. At a function 404, the electronic lockbox 10 is placed in a test fixture with no significant EMI (electromagnetic interference), no key fob 70, and no bin 40.

Next, at a function 410, a test sample of the input voltage "$V_{IN}$" (the voltage magnitude input to the ADC 831, from the output "v" of the magnetic sensor 20) is measured to determine a quiescent value for the input voltage "v" in this state. Then, at an operational decision 412, the voltage value of "v" is reviewed to see if it fell within expected values. If not, then at a function 414, the lockbox is set aside for repair. However, if the voltage is within expected values, then at a function 416 the voltage value "v" is stored for use as the "$V_{MAX}$" value for this lockbox, with a predetermined tolerance (as determined by the lockbox system designer).

Then, at a function 420, the movable bin 40 is installed so that the bin 40 is moved to its closed position. Next, at a function 422, a second sample of the input voltage "$V_{IN}$" is measured to determine a "Second State" value. Then, at an operational decision 424, the new Second State voltage reading for "v" is reviewed to see if it falls within expected values. If not, then the routine moves to the function 414, and the lockbox is set aside for repair. However, if the new Second State voltage is within expected values, then at a function 426 the new Second State voltage value is stored for "v," which will be used as the "$V_A$" value for this lockbox, with a predetermined tolerance (as above).

The routine continues at a function 430, in which the key fob 70 is installed in the (temporarily open) bin 40, and the movable bin 40 is moved to the closed position. Then, at a function 432, another input voltage ("$V_{IN}$") is measured to determine a Third State value. Next, at an operational decision 434, the Third State voltage reading for "v" is reviewed to see if it falls within expected values. If not, then the routine moves to the function 414, and the lockbox is set aside for repair. However, if the Third State voltage reading is within expected values, then at a function 436 the Third State voltage value is stored for "v," which will be used as the "$V_B$" value for this lockbox, with a predetermined tolerance (as above).

Next, at a function 440 the lockbox is encoded with the determined values of $V_{MIN}$, $V_A$, and $V_B$ for use with this particular lockbox—i.e., those values will be stored in this lockbox's non-volatile memory for later use. Last, at a function 442, the routine finishes.

Operation and Calibration

The present technology incorporates a single linear analog magnetic sensor 20 (such as a Hall effect sensor, for example) to act as a detector for both (1) determining if the lockbox's movable bin 40 is closed and (2) determining if the appropriate building key 76 has been returned to that movable bin 40. It is often desirable to determine whether a specific building key 76 has been returned to an electronic lockbox 10, in a manner such that the next person to access the lockbox 10 has a reasonable certainty that the appropriate building key 76 is present for use. This is especially desirable for lockboxes located in remote or distant locations. The desirability of this function is more fully described in U.S. Pat. No. 7,999,656 B2, owned by SentriLock, LLC.

The electronic lockbox 10 includes a system control circuit that incorporates a magnetic sensor 20 (such as a Texas Instruments DRV5053-series linear analog Hall effect sensor, for example) that may be coupled to a microcontroller's ADC input pin, and this ADC input pin would then receive the analog voltage supplied by the magnetic sensor, so that the ADC 831 can then measure that analog input voltage. In the lockbox 10, the movable bin has affixed to it a key bin magnet 32 (a permanent magnet that is also sometimes referred to herein as the "first magnet"), and when the movable bin 40 is closed the key bin magnet 32 is proximally positioned to have its magnetic field interact with the magnetic sensor 20 (i.e., when the bin 40 is in a closed state). In this closed state, with the key bin magnet 32 imparting a magnetic field that is sufficiently above a predetermined detection level of the magnetic sensor 20, the magnetic sensor 20 will provide a significantly different voltage level to the ADC input pin. A stored computer program on the microcontroller 816 can be executed to sample this different voltage level and to determine whether the movable bin 40 is in its closed position. Typically, the preferred magnetic sensor 20 outputs a nominal voltage of about 1.00 volt (1 VDC) when no significant magnetic field (i.e., other than the Earth's omnipresent magnetic field) is present, for example. In the closed state, the voltage rises or falls (depending on the magnetic field's polarity and sensor configuration) in proportion to the magnetic field impacting the sensor 20.

The key return detection is accomplished through the use of a special key chain 70 that has a key ring 80 on one end, and a special "cap" 78 on its opposite end. The special cap 78 includes a permanent magnet, that will sometimes be referred to herein as a "cap magnet" 72. The cap magnet 72 (which, as a permanent magnet, will also sometimes be referred to herein as the "second magnet") is polarized so that it will easily attach itself over the top of the movable key bin magnet 32 (which, as a permanent magnet, will also sometimes be referred to herein as the "first magnet"). The combination of the magnetic fields produced by the cap (second) magnet 72 plus the magnetic field produced by the movable bin (first) magnet 32 creates a net magnetic field level that is significantly greater than that produced only by the first magnet 32. The magnetic sensor 20 is operable to detect these various magnetic field levels (magnitudes), which then can be differentiated by a measuring device, such as an A/D converter. Furthermore, due to the significant magnetic coupling force between the two magnets 32 and 72, and a mechanical rib 82 around the cap magnet 72, a "self-locating" effect is created, so that a user can easily place the special magnetic cap 78 (that typically has a specific building key 76 attached thereto) inside the movable bin 40.

The movable bin 40 and magnetic cap 78 configuration provides three possible magnetic field strengths that can reliably and repeatedly be presented to the magnetic sensor 20. A first detection state is one having no significant magnetic field present (beyond the quiescent magnetic field provided by the Earth itself) when the movable bin 40 is open; a second detection state occurs when the key bin's (the "first") magnet 32 alone is proximal to the lockbox's magnetic sensor 20; and a third detection state occurs when the key bin magnet 32 and the cap ("second") magnet 72 are both proximal to the magnetic sensor 20 (and thereby producing a combined magnetic field). Using a single magnetic sensor 20, these various magnetic field states can be detected and measured with sufficient certainty by the ADC, thereby enabling the microcontroller 816 to then determine the different voltages presented (in a set of expected voltage ranges), and thus is able to determine which of the three predetermined conditions is presently in effect.

Selection of the magnetic sensor 20 and the two magnets 32 and 72 is important for this lockbox system. The magnetic sensor's 20 sensitivity must be considered in relation to the magnetic fields provided (by the two permanent magnets 32 and 72) along with the two magnets' 32 and 72 relative proximity to the magnetic sensor 20, such that the voltage changes produced will provide a significant dynamic range of voltage magnitudes to the ADC input pin. The voltage thresholds must account for variability in the sensitivity of the magnetic sensor 20, variability of magnet strength of the two permanent magnets 32 and 72, mechanical tolerances of lockbox 10 construction and movable bin 40 placement when installed in the lockbox 10, the ADC resolution (measured as the Effective Number of Bits or "ENOB"), and the reference voltage source accuracy. Also, temperature variations in the magnetic sensor 20 and temperature effects on magnetic field strength must be considered.

Preferably, the stored program of the microcontroller 816 is operable to determine and store magnetic field level (magnitude) measurements (e.g., $V_{MIN}$, $V_A$, $V_B$, $V_1$ and $V_2$ as discussed above) that can be used to calibrate the detected voltage states produced by the magnetic sensor 20, and then to arrive at series of detection points that correspond to the three desired physical states of the permutations relating to the positions of the movable bin 40 and the appropriate building key 76 (i.e., more accurately, the building key's associated key fob 70). The first calibration step is to determine the quiescent voltage produced when no external magnetic field is present (i.e., to create a first calibration point—i.e., $V_{MIN}$). This calibration can occur at time of manufacturing the lockbox 10 by reading the magnetic sensor 20 output when no magnet is present—i.e., when the movable bin 40 is "open" (removed from the lockbox's main body 64). The calibration voltage reading (i.e., the ADC's 831 digital output numeric value) is stored in non-volatile memory that is accessible (readable) by the lockbox's system controller 816, and used later as a reference to other ADC 831 readings taken. (Multiple readings can be quickly sampled by the ADC 831 to determine an average value, if desired, for a greater noise immunity characteristic.)

The second calibration step is to determine a second calibration point $V_1$, in which the magnetic field is measured using an assembled lockbox 10 with the movable bin in its closed state and no special magnetic cap 78 present—in other words, the building key 76 is not present in the movable bin 40 for the purposes of this second calibration step (i.e., to determine the value called $V_1$). The ADC input pin will measure an increase in voltage, and the sampled digital output signal produced by the ADC 831 will increase in numeric valve, which the microcontroller 816 will effectively determine as an increase in magnetic field strength, and then this result will be stored in the non-volatile memory. (Again, multiple readings can be sampled and averaged for better accuracy and greater noise immunity.)

A third calibration point $V_2$ is possible to determine, but not necessarily needed, as it could be inferred, if desired. The purpose of the third calibration point is to determine a predictable magnetic field value (i.e., as measured at the output of the ADC 831) if the movable bin 40 is closed and further, if the special magnetic cap 78 also is present in the movable bin 40 (i.e., to determine the value called $V_2$). Any magnetic sensor 20 reading with a magnitude of change greater than the second calibration point $V_1$ reading plus a predetermined tolerance factor could suffice to indicate the third calibration point $V_2$. This tolerance factor may be determined by experimental result coupled with a sampling of assembled units to ensure the tolerance is sufficient to account for temperature variations, mechanical tolerance stack-up, and inherent magnetic sensor or ADC 831 conversion non-linearity.

It is expected that the magnetic sensor 20 will return a variety of readings when measuring the two permanent magnets 32 and 72 that are expected to be used in the detection of the movable bin 40 insertion and the key cap's 78 return. The readings will be a function of: (1) mechanical tolerances—the position of the magnets 32 and 72 will possibly vary in all three axis; (2) each permanent magnet 32 and 72 itself will have a magnetic field strength that varies from "magnet to magnet," as this attribute is not tightly controlled for commercial-grade magnets; (3) the magnetic sensor 20 baseline sensitivity will likely vary; and (4) the magnetic sensor 20 model itself is important, as the indicated voltage may change plus or minus a tolerance amount around the 1 volt (typical) center value, based on the magnetic sensor 20 model and its magnetic field polarity.

Given this expected high degree of variability of the readings from the magnetic sensor 20, one approach to the measuring of the three states (State ONE=open movable bin 40, State TWO=closed movable bin 40 but key 76 not present, and State THREE=closed movable bin 40 and key present 76) is described, as follows. In the open movable bin 40 state, the voltage reading from the sensor 20 should be roughly 1 volt, plus or minus any stray magnetic field, or ADC input pin error. This value will be significantly below any desired minimum detection threshold (that would represent one of the other two possible states). Readings taken by the ADC 831 will produce a digital output numeric value that could be used as the minimum detection threshold $V_{MIN}$ (which is similar to a first calibration point of the above-described procedure).

Given that the magnetic sensor 20 returns voltages higher or lower than the 1V center based on magnetic polarity, the magnitude of the reading must be calculated to allow for a variety of magnetic sensor types. For all ADC input pin reading voltage values, these values should be subtracted from 1V and the absolute value taken to determine the magnitude of change: m=abs(1.00−ADC).

The detection calibration scheme could work in the following way, at product assembly time (while in manufacturing mode): when the movable bin 40 is closed, the magnetic field magnitude "m" should change from a value below the minimum detection threshold "$V_{MIN}$" to some value above that threshold. A settling time should be factored in, about 1-2 seconds, for example. A reading by the magnetic sensor 20 can be taken by sampling the digital output value of the ADC 831. This becomes the calibration point value "$V_A$" of this alternative procedure (which is similar to a "second calibration point" of the above-described procedure).

A magnitude range band should be established +/−a certain percentage of the calibration point, about +/−15%, for example. This could allow for a variety of factors that influence the magnet's 32 position to be compensated for, as well as any temperature drift of the magnetic sensor 20 or the circuit's voltage reference. When the special magnetic cap 78 is attached, the magnetic field magnitude change should rise sustainably above the second calibration point $V_A$. A second range band for a value "$V_B$" should be established for this condition to, again, ensure any magnet location or placement issues are compensated for. In all cases, the low value of the second range band $V_B$ must be above the high value of the first range band $V_A$ to prevent conflicting states. Also, the low value of the first range $V_A$ must be above the minimum detection threshold $V_{MIN}$. (Note: the description in this paragraph assumes that the additive magnetic field strengths will all be moving in a positive polarity direction, with respect to the digital output signal value produced by the ADC 831.)

Specific Implementation Routine

Figure 24:
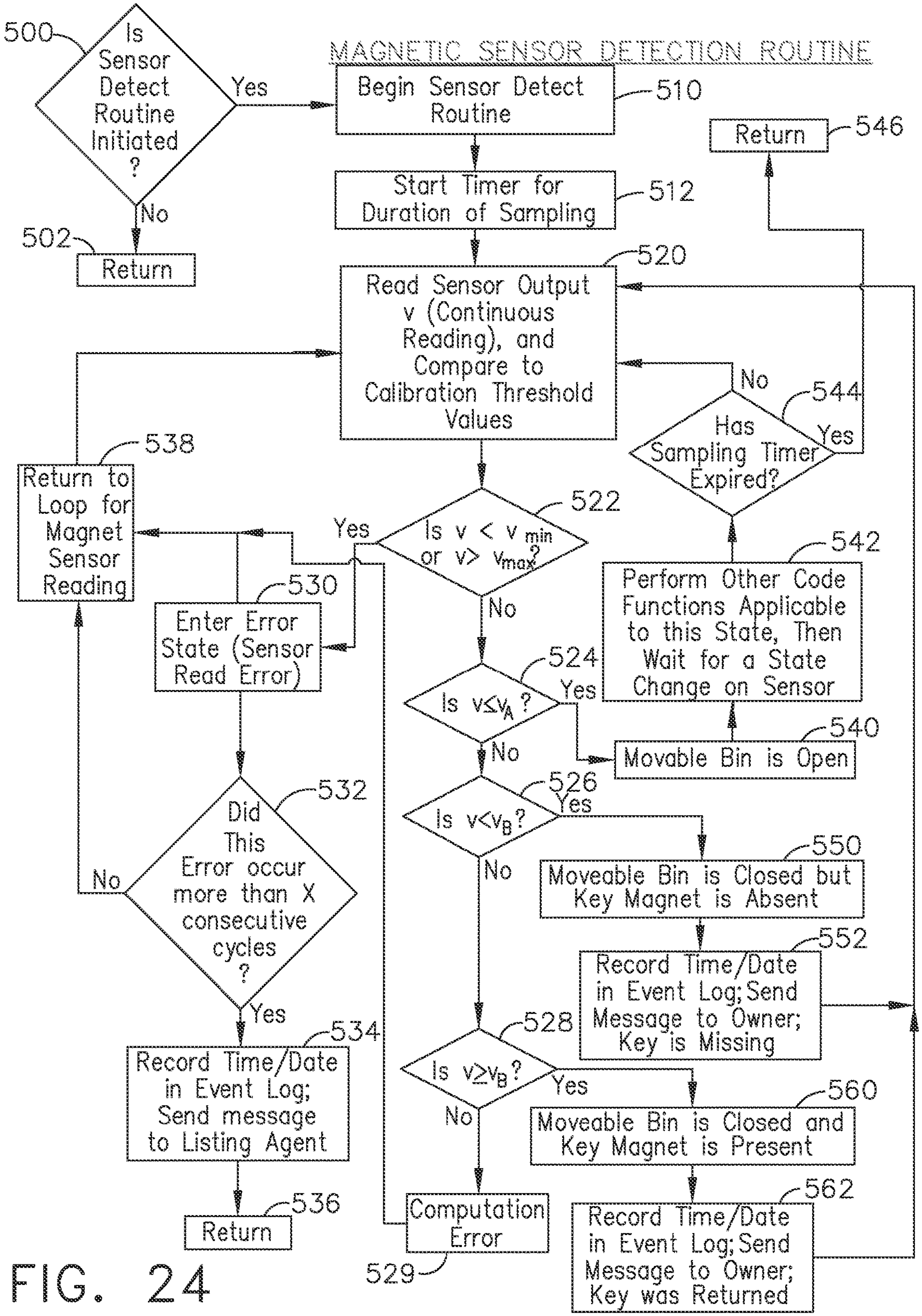
FIG. 24 is a flow chart of certain functions performed during a "Magnetic Sensor Detect Routine" for a second embodiment 'specific case,' as used in the electronic lockbox of FIG. 1.

Referring now to FIG. 24 another flow chart for a "Magnetic Sensor Detect Routine" is depicted. This flow chart is for a second embodiment 'specific case' routine; as discussed above, a more general first embodiment routine is described in connection with FIG. 20. And note: this example routine is useful for both a "forward polarity response" magnetic sensor and a "reverse polarity response" magnetic sensor, which were discussed above.

Beginning with an operational decision at 500, the main system controller determines whether or not the "sensor detect" routine has been initiated by the main computer program that is executing in the system controller. If not, then the logic flow is directed to a "Return" function at 502, and the system continues to perform other functions in the lockbox, or the processor goes into a 'sleep' mode. However, if the answer was YES, then the logic flow is directed to a "Begin Sensor Detect" Routine at a function 510.

A timer is started at a function 512, and this timer runs for the duration of sampling of the magnetic sensor 20. A function 520 now reads the magnetic sensor's output voltage, in a 'continuous reading' mode—which means that the A/D Converter 831 samples the output voltage very quickly. The output of the ADC 831 is a digital numeric value, called "v" hereinbelow, which is compared to Calibration Threshold values that were previously determined at the time of calibrating this electronic lockbox. (This is in reference to a flow chart depicted in FIG. 25, discussed below.) These calibration values are compared, as described below.

An operational decision 522 determines if the value "v" is either less than a value called "$v_{min}$", or greater than a value called "$v_{max}$". Either case is a bad result, and if true, the logic flow is directed to a function 530 in which the controller enters a temporary "Error State"—meaning there was a sensor "read error." An operational decision 532 now determines if this "read error" has occurred more than "X" consecutive times, and if so, a function 534 records this event in the Event Log, and sends a message to the "listing agent" (i.e., the lockbox owner) to inform him/her about the problem. (Note: the value of "X" is determined by the system designer of this electronic lockbox product.) This routine now returns to performing other functions by the system controller, at a function 536.

If the sensor "read error" has occurred fewer than "X" consecutive times, then the logic flow moves to a function 538, and returns to the 'control loop' for taking more readings of the magnetic sensor, back at function 520. Hopefully there will be no further sensor "read errors" at the decision 522. If that is indeed the case, then an operational decision determines if "v" is less than or equal to the value of $V_A$. If so, then it is determined that the movable bin has been opened, at a function 540.

A function 542 now performs other operations, as programmed for the software that is executing on the system controller, for such functions that are applicable to this logic state. (It will be understood that those 'other' operations are not specifically part of this flow chart of FIG. 24.) This routine of FIG. 24 essentially 'waits' for a state change as detected by the magnetic sensor 20. In essence, this means that the other comparisons of the value "v" are continually being made while this function 542 seems to be merely waiting (see below). It will be understood that this flow chart of FIG. 24 is only describing this "Sensor Detection Routine," while the actual operating software of the lockbox's system controller is able to perform many of the routines, in a multitasking software environment.

The logic flow of FIG. 24 does not truly 'wait' at the function 542. It continues to an operational decision 544, which determines whether or not the "Sampling Timer" has expired. In other words, has the timer (that started timing at the function 512) timed out? If so, then this "Sensor Detect Routine" will return to other tasks, at a Return function 546. The main system software will initiate this routine again, as per the commands that are executed in the main software computer program running on the system controller.

On the other hand, if the Sampling Timer has not yet expired, then the logic flow is directed back to the function 520, for further sensor sampling. It should be noted that, if "v" is less than or equal to $V_A$, then the magnetic sensor 20 is essentially detecting a quiescent state (i.e., the Earth's magnetic field), and no artificial magnetic field of appreciable strength is being detected at the operational decision 524. However, if the value for "v" is greater than $V_A$, then the logic flow moves to an operational decision 526, in which it is determined if "v" is less than $V_B$.

If "v" is less than $V_B$, then a function 550 determines that the movable bin is closed, but the key fob's magnet is absent from the bin's receptacle space 40. (Note: this conclusion was reached only after the decision at 524 determined that "v" was greater than $V_A$, and then (logically cumulatively) the decision at 526 determined that "v" was still less than $V_B$.) In this logic state, a function 552 now records the time and date in the Event Log for this lockbox.

Optionally, the user/owner can be notified that the building key is missing. This last function at 552 is optional, because some users will (perhaps absentmindedly) close the key bin immediately after removing the building key from the lockbox, even though that same user will need to keep that building key for awhile—certainly at least long enough to open the lock on the building! (Note: in real estate settings, the "user" is typically referred to as the "showing agent," whereas the "owner" is typically referred to as the "listing agent" for that property.) The logic flow now executes other lockbox functions at the Return function 546.

If "v" is greater than or equal to $V_B$, as determined by an operational decision 528, then a function 560 determines that the movable bin is closed and that the key fob's magnet is present in the lockbox key compartment. This is the overall desired result at the end of a real estate "showing," of course, and now a function 562 records the time/date in the Event Log of the lockbox. Optionally, a message can be sent to the lockbox owner to inform him or her that the building key has been returned to the lockbox. The logic flow is now directed to the Return function at 546. Alternatively, if "v" is not greater than or equal to $V_B$ at operational decision 528, then a computation error has likely occurred at a function 529, and the logic flow is directed back to the function 538, for further sensor readings to be taken.

Note that most, or all, of the messages that are to be sent to the "owner" will not literally be sent by the lockbox. Instead, the user's smart phone—acting as an electronic key that is used to open the lockbox—will send a message (usually via cellular phone technology) to a central computer, and then the central computer will send an appropriate message (usually via e-mail) to the owner of the lockbox. Also, note that messages can be sent to the user's smart phone directly by the lockbox, assuming the user is still within 'short' wireless range of that lockbox.

The above discussion about the flow chart of FIG. 24 did not explain how the lockbox is able to detect the magnets of the key bin and the key fob using either a "forward polarity response" magnetic sensor or a "reverse polarity response" magnetic sensor. In this flow chart, it is assumed that a "Standardization Algorithm" will be in use for calibrating the lockbox's magnetic sensor prior to any range comparison for the key bin and the key fob detection, regardless of whether that sensor comprises a "forward polarity response" variant or a "reverse polarity response" variant. Some examples of this will be described below, and will be in play for the next flow chart of FIG. 25, which describes a "Calibration Routine" for this second embodiment that is a more 'specific case' routine. (Note that this "Standardization Algorithm" will be in use for the magnetic sensor readings during normal operation of the lockbox.)

Before discussing FIG. 25, a more specific set of values will now be described for the types of magnetic sensors that are deemed suitable for this type of lockbox. As noted above, the "RA variant" sensor is the "forward polarity response" device, and the "EA variant" is the "reverse polarity response" device. These were described, along with example response curves in FIGS. 17-18 and 22-23. Both variants of these sensors will output a quiescent voltage of about 1.0 volt DC, if the power supply voltage is about 2.0 volts DC. Therefore, 1.0 volt is considered to be the 'lowest value' on the expected range of ADC output values for the RA variant, while that same 1.0 volt is considered to be the 'highest value' on the expected range of ADC output values for the EA variant.

The RA and EA variants have approximately the same sensitivity response curves when immersed in a given magnetic field, but in opposite directions from the quiescent state. In other words, if a particular magnet is placed at a fixed distance from the RA variant, then its output voltage will increase by "X" volts DC; using the same magnet and same fixed distance from the EA variant, its output voltage will decrease by "X" volts DC. Therefore, the difference between $V_{quiescent}$ and $V_X$ will be either +X volts or −X volts. The absolute value of these two differential values will be "X" in both cases. Thus, the sensor's detection scheme can be based upon determining these differential voltages (i.e., the difference between the quiescent voltage of 1.0 volt and the sensed voltage "v") whether or not the EA variant or the RA variant is used, by taking the absolute value of those differential voltages. (This is a subtraction, not a derivative.)

More specifically, referring back to the graphs of FIGS. 17 and 22, the differential value between $V_{MIN}$ (at 212) and $V_1$ (at 214) can be referred to as "+X", while the different valve between $V_{MAX}$ (at 232) and $V_3$ (at 234) can be referred to as "−X". The absolute value of these differential values is "X" either way. Furthermore, on FIGS. 18 and 23, the differential value between $V_{MIN}$ (at 222) and $V_2$ (at 224) can be referred to as "+Y", while the different valve between V MAX (at 242) and $V_4$ (at 244) can be referred to as "−Y". The absolute value of those differential values is "Y" either way. This is the basis for the calibration routine that will be now described in FIG. 25.

The second embodiment Magnetic Sensor Calibration Routine begins at a function 600. The lockbox is placed in a test fixture with its movable key bin installed and closed, but without a key fob inside, at a function 602. The next function 610 begins reading data from the magnetic sensor's output signal, which is directed to the lockbox's A/D Converter 831. At a function 612, several sample voltage readings from the sensor are taken to determine a nominal key bin closed value, referred to on FIG. 25 as $V_C$.

An operational decision 614 now determines whether $V_C$ was within expected values, using an example equation of $V_{C,min}<V_C<V_{C,max}$. If the result is NO, then this lockbox is set aside for repair, at a function 616. Otherwise, a function 620 stores this value for $V_C$ and will now use it to calculate "range limit values" that will be used in the "Magnetic Sensor Detect Routine" described in the flow chart of FIG. 24.

A function 622 now uses $V_C$ to determine the values for $V_A$ and $V_B$ that were seen on the graphs of FIGS. 17 and 18, for example. In this calibration routine, the following equations will be used:

$$V_A=V_C/2$$

$$V_B=(3V_C)/2$$

Figure 25:
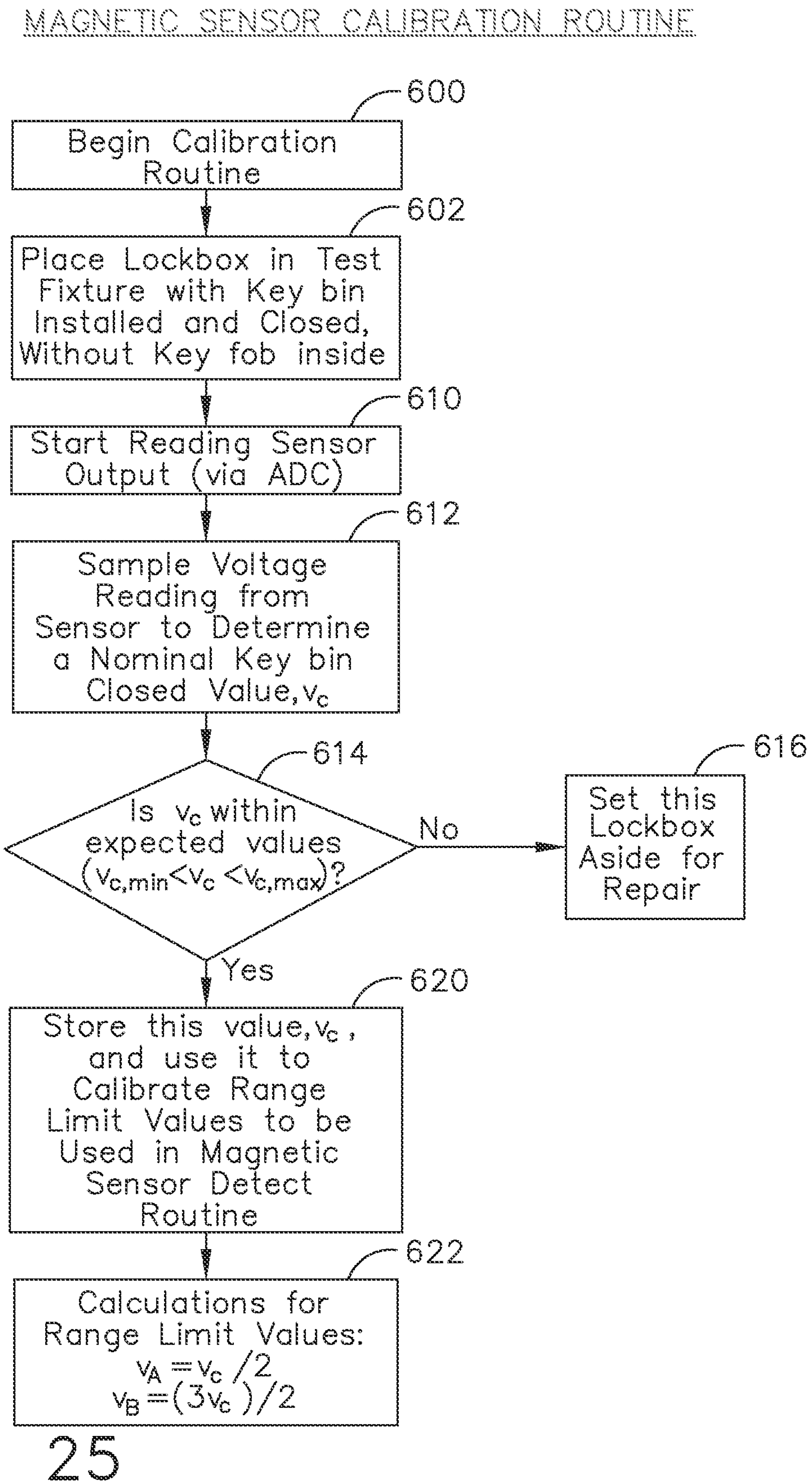
FIG. 25 is a flow chart of certain functions performed during a "Magnetic Sensor Calibration Routine" for a second embodiment 'specific case,' as used in the electronic lockbox of FIG. 1.

Note that, in this discussion about the calibration routine of FIG. 25, the variable referred to as $V_C$ does not have the same meaning as the threshold value $V_C$ on the graphs of FIG. 22 or FIG. 23.

Some additional information about "basic" lockbox embodiments, including advanced features, are more fully described in earlier patent documents by some of the same inventors, and assigned to SentriLock, Inc. or SentriLock LLC, including: U.S. Pat. No. 7,009,489, issued Mar. 7, 2006, for ELECTRONIC LOCK SYSTEM AND METHOD FOR ITS USE; U.S. Pat. No. 6,989,732, issued Jan. 24, 2006, for ELECTRONIC LOCK SYSTEM AND METHOD FOR ITS USE WITH CARD ONLY MODE; U.S. Pat. No. 7,086,258, issued Aug. 8, 2006, for ELECTRONIC LOCK BOX WITH SINGLE LINEAR ACTUATOR OPERATING TWO DIFFERENT LATCHING MECHANISMS; U.S. Pat. No. 7,420,456, issued Sep. 2, 2008, for ELECTRONIC LOCK BOX WITH MULTIPLE MODES AND SECURITY STATES; U.S. Pat. No. 7,193,503, issued Mar. 20, 2007, for ELECTRONIC LOCK SYSTEM AND METHOD FOR ITS USE WITH A SECURE MEMORY CARD; U.S. Pat. No. 7,999,656, issued Aug. 16, 2011, for ELECTRONIC LOCK BOX WITH KEY PRESENCE SENSING; U.S. Pat. No. 7,734,068, issued Jun. 8, 2010, for ELECTRONIC LOCK BOX USING A BIOMETRIC IDENTIFICATION DEVICE; U.S. Pat. No. 8,451,088, issued May 28, 2013, for ELECTRONIC LOCK BOX WITH TRANSPONDER BASED COMMUNICATIONS; U.S. Pat. No. 8,164,419, issued Apr. 24, 2012, for ELECTRONIC LOCK BOX WITH TIME-RELATED DATA ENCRYPTION BASED ON USER-SELECTED PIN; U.S. Pat. No. 8,151,608, issued Apr. 10, 2012, for ELECTRONIC LOCK BOX WITH MECHANISM IMMOBILIZER FEATURES; U.S. Pat. No. 9,208,466, issued on Nov. 18, 2015, for ELECTRONIC LOCK BOX SYSTEM WITH INCENTIVIZED FEEDBACK; U.S. Pat. No. 8,593,252, issued Nov. 26, 2013, for ELECTRONIC LOCK BOX PROXIMITY ACCESS CONTROL; U.S. Pat. No. 8,912,884, issued Dec. 16, 2014, for ELECTRONIC KEY LOCKOUT CONTROL IN LOCKBOX SYSTEM; U.S. Pat. No. 9,053,629, issued on May 20, 2015, for CONTEXTUAL DATA DELIVERY TO MOBILE USERS RESPONSIVE TO ACCESS OF AN ELECTRONIC LOCKBOX; U.S. Pat. No. 9,478,083, issued on Oct. 5, 2016, for ELECTRONIC KEY LOCKOUT CONTROL IN LOCKBOX SYSTEM; U.S. Pat. No. 9,704, 315, issued on Jun. 21, 2017, for CONTEXTUAL DATA DELIVERY TO OTHER USERS AT AN ELECTRONIC LOCKBOX; U.S. Pat. No. 10,068,399, issued on Aug. 21, 2018, for CONTEXTUAL DATA DELIVERY TO OTHER USERS AT AN ELECTRONIC LOCKBOX; U.S. Pat. No. 10,026,250, issued on Jun. 27, 2018, for CONTEXTUAL DATA DELIVERY TO USERS AT A LOCKED PROPERTY; U.S. patent application No. 2020/0308870, published on Oct. 1, 2020, for IMPROVED ELECTRONIC LOCKBOX; U.S. patent application No. 2020/0308868, published on Oct. 1, 2020, for IMPROVED ELECTRONIC LOCKBOX; U.S. patent application No. 2020/0308869, published on Oct. 1, 2020, for IMPROVED ELECTRONIC LOCKBOX; U.S. patent application No. 2020/0312067, published on Oct. 1, 2020, for IMPROVED ELECTRONIC LOCKBOX; and U.S. patent application No. 2020/0308871, published on Oct. 1, 2020, for IMPROVED ELECTRONIC LOCKBOX. These patent documents are incorporated by reference herein, in their entirety.

All documents cited in the Background and in the Detailed Description are, in relevant part, incorporated herein by reference; the citation of any document is not to be construed as an admission that it is prior art with respect to the technology disclosed herein.

It will be understood that the logical operations described in relation to the flow charts of FIGS. 20-21 can be implemented using sequential logic (such as by using microprocessor technology), or using a logic state machine, or perhaps by discrete logic; it even could be implemented using parallel processors. One preferred embodiment may use a microprocessor or microcontroller (e.g., microcontroller 816) to execute software instructions that are stored in memory cells within an ASIC. In fact, the entire microcontroller 816, along with RAM and executable ROM, may potentially be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a microcomputer, a microcontroller, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information (such as the lockbox access log data stored, for example, in memory elements 821 or 823), or perhaps by a type of memory device not yet invented.

It will also be understood that the precise logical operations depicted in the flow charts of FIGS. 20-21, and discussed above, could be somewhat modified to perform similar, although perhaps not exact, functions without departing from the principles of the technology disclosed herein. The exact nature of some of the decisions and other commands in these flow charts are directed toward specific future models of lockbox systems (those involving lockboxes sold by SentriLock, LLC, for example) and certainly similar, but somewhat different, functions/decisions would be taken for use with other models or brands of lockbox systems in many instances, with the overall inventive results being the same.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

Additionally, it will be understood that a computing product that includes a display to show information to a human user, and that also includes a "user operated input circuit" so the human user is able to enter commands or data, can be provided with a single device that is known as a "touchscreen display." In other words, if a patent claim recites a "display" and a "user operated input circuit" as two separate elements, then a single touchscreen display, in actually, is exactly the same thing. It should be noted that a touchscreen display usually includes a virtual keypad, and therefore, a "user operated input circuit" typically comprises a virtual keypad, particularly on smart phones and on tablet computers. Moreover, in this situation, the word "virtual" means that it is not a hardware keypad; more specifically, "virtual" means that it is formed (i.e., "created") on the display screen because of software being executed by a processing circuit.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. An electronic lockbox with a multifunction sensor comprising:

(a) a housing, the housing including:
  a bin receptacle space; and
  a lock that is associated with the bin receptacle space;

(b) an electronic control circuit, including: a processing circuit, a memory circuit including instructions executable by the processing circuit, and an input/output interface circuit, wherein the processing circuit is in communication with at least one of the memory circuit and the input/output interface circuit;

(c) a movable bin that is either locked in place at the bin receptacle space, or is in a released state so as to be removable from at least a portion of the bin receptacle space, in which the lock is under the control of the processing circuit;

(d) a magnetic sensor mounted inside the housing, proximal to the bin receptacle space;

(e) a first magnet mounted on the movable bin;

(f) a removable magnetic cap that includes a second magnet, in which the removable magnetic cap is magnetically attachable to the first magnet;

wherein:

(g) the electronic lockbox exhibits three operating states, such that
  (i) in a first operating state;
    (A) the movable bin is released from the bin receptacle space, and
    (B) the first magnet is positioned distal from the magnetic sensor at a sufficiently far distance so that the magnetic sensor effectively does not detect the first magnet;
  (ii) in a second operating state:
    (A) the movable bin is locked in place at the bin receptacle space, and
    (B) the first magnet is positioned proximal to the magnetic sensor at a sufficiently close distance so that the magnetic sensor effectively detects the first magnet;
    (C) the removable magnetic cap is not attached to the first magnet, and the second magnet is positioned distal from the magnetic sensor at a sufficiently far distance so that the magnetic sensor effectively does not detect the second magnet;
  (iii) in a third operating state:
    (A) the movable bin is locked in place at the bin receptacle space;
    (B) the removable magnetic cap is magnetically attached to the first magnet; and
    (C) the first magnet and the removable magnetic cap are both positioned proximal to the magnetic sensor at a sufficiently close distance so that the magnetic sensor effectively detects both the first magnet and the second magnet;

(h) in the first operating state, the magnetic sensor outputs a first signal having a first voltage magnitude, the first signal is communicated to at least one of the input/output interface circuit and the processing circuit, and, if the first voltage magnitude is within a predetermined first range of values, then the processing circuit determines that the first voltage magnitude indicates that the movable bin is in a released position;

(i) in the second operating state, the magnetic sensor outputs the first signal having a second, greater, voltage magnitude, the first signal is communicated to at least one of the input/output interface circuit and the processing circuit, and, if the second voltage magnitude is within a predetermined second range of values, then the processing circuit determines that the second voltage magnitude indicates that the movable bin is in a locked position, and that the removable magnetic cap is not present in the movable bin; and (j) in the third operating state, the magnetic sensor outputs the first signal having a third, yet greater, voltage magnitude, the first signal is communicated to at least one of the input/output interface circuit and the processing circuit, and, if the third voltage magnitude is within a predetermined third range of values, then the processing circuit determines that the third voltage magnitude indicates that the movable bin is in a locked position, and that the removable magnetic cap is present in the movable bin.

2. The electronic lockbox of claim 1, wherein: the magnetic sensor comprises a Hall effect sensor.

3. The electronic lockbox of claim 1, wherein: at least one of the input/output interface circuit and the processing circuit includes an analog-to-digital converter that receives the first signal.

4. The electronic lockbox of claim 1, wherein: the magnetic cap is sized and shaped so that it cannot be placed in a proximal position with respect to the magnetic sensor that is physically near enough so that the second magnet is effectively detected, unless the movable bin is placed in its locked position.

5. The electronic lockbox of claim 1, wherein: the magnetic cap is physically attached to a building key.

6. The electronic lockbox of claim 5, wherein:

(a) the magnetic cap is sized and shaped so that it readily attaches to the first magnet, while at the same time, both the building key and the magnetic cap physically are placed within the movable bin, and (b) if the movable bin is moved to its closed and locked position, both the first magnet and the second magnet are effectively detected by the magnetic sensor.

7. The electronic lockbox of claim 1, wherein: the first magnet comprises a permanent magnet, and the second magnet comprises a permanent magnet.

8. The electronic lockbox of claim 1, wherein: in the first operating state:

(a) the first signal exhibits the first voltage magnitude if the removable magnetic cap is attached to the first magnet; and (b) the first signal exhibits the first voltage magnitude if the removable magnetic cap is not attached to the first magnet.

9. The electronic lockbox of claim 1, further comprising:

a shackle that is either locked in place or is in a released state, under the control of the processing circuit.

10. An electronic lockbox, comprising:

(a) a housing that includes a lock;

(b) an electronic control circuit, including: a processing circuit, a memory circuit including instructions executable by the processing circuit, and an input/output interface circuit, wherein the processing circuit is in communication with at least one of the memory circuit and the input/output interface circuit;

(c) a closable secure container that is either locked in place or is released, which is under the control of the processing circuit;

(d) a removable key fob that is storable in the closable secure container; and (e) a single sensor mounted in the housing;

wherein:

(f) the single sensor is operable to detect whether the closable secure container is locked in place or is released; and (g) if the closable secure container is locked in place, then the single sensor is also operable to detect the presence or absence of the removable key fob.

11. The electronic lockbox of claim 10, wherein: the single sensor comprises a non-contact sensor.

12. The electronic lockbox of claim 10, wherein: the single sensor comprises a magnetic proximity sensor.

13. The electronic lockbox of claim 12, wherein: the single sensor comprises a Hall-effect sensor.

14. The electronic lockbox of claim 12, wherein:

(a) the closable secure container includes a first magnet such that, if the closable secure container is locked in place the first magnet is positioned proximal to the single sensor, and, if the closable secure container is released the first magnet is positioned distal from the single sensor; and (b) the removable key fob includes a second magnet such that, if the removable key fob is stored in the closable secure container and if the closable secure container is locked in place the second magnet is positioned proximal to the single sensor, and, if the removable key fob is removed from the closable secure container the second magnet is positioned distal from the single sensor.

15. The electronic lockbox of claim 14, wherein: the single sensor is in communication with the processing circuit such that:

(a) if the single sensor detects the first magnet, then the closable secure container is locked in place;

(b) if the single sensor does not detect the first magnet, then the closable secure container is released;

(c) if the single sensor detects the second magnet, then the removable key fob is stored in the closable secure container and the closable secure container is locked in place; and (d) if the single sensor does not detect the second magnet, then the removable key fob is removed from the closable secure container.

16. The electronic lockbox of claim 10, wherein: the key fob is removably attachable to a physical building key.

17. An electronic lockbox with a multifunction sensor comprising:

(a) a housing, the housing including:

a bin receptacle space; and a lock that is associated with the bin receptacle space;

(b) an electronic control circuit, including: a processing circuit, a memory circuit including instructions executable by the processing circuit, and an input/output interface circuit, wherein the processing circuit is in communication with at least one of the memory circuit and the input/output interface circuit;

(c) a movable bin that is either locked in place at the bin receptacle space, or is in a released state so as to be removable from at least a portion of the bin receptacle space, in which the lock is under the control of the processing circuit;

(d) a magnetic sensor mounted inside the housing, proximal to the bin receptacle space;

(e) a first magnet mounted on the movable bin;

(f) a removable magnetic cap that includes a second magnet, in which the removable magnetic cap is magnetically attachable to the first magnet;

wherein:

(g) the electronic lockbox exhibits three operating states, such that (i) in a first operating state;

(A) the movable bin is released from the bin receptacle space, and (B) the first magnet is positioned distal from the magnetic sensor at a sufficiently far distance so that the magnetic sensor effectively does not detect the first magnet;

(ii) in a second operating state:

(A) the movable bin is locked in place at the bin receptacle space, and (B) the first magnet is positioned proximal to the magnetic sensor at a sufficiently close distance so that the magnetic sensor effectively detects the first magnet;

(C) the removable magnetic cap is not attached to the first magnet, and the second magnet is positioned distal from the magnetic sensor at a sufficiently far distance so that the magnetic sensor effectively does not detect the second magnet;

(iii) in a third operating state:

(A) the movable bin is locked in place at the bin receptacle space;

(B) the removable magnetic cap is magnetically attached to the first magnet; and (C) the first magnet and the removable magnetic cap are both positioned proximal to the magnetic sensor at a sufficiently close distance so that the magnetic sensor effectively detects both the first magnet and the second magnet;

(h) in the first operating state, the magnetic sensor outputs a first signal having a first voltage magnitude, the first signal is communicated to at least one of the input/output interface circuit and the processing circuit, and, if the first voltage magnitude is within a predetermined first range of values, then the processing circuit determines that the first voltage magnitude indicates that the movable bin is in a released position;

(i) in the second operating state, the magnetic sensor outputs the first signal having a second voltage magnitude, the first signal is communicated to at least one of the input/output interface circuit and the processing circuit, the second voltage magnitude is subtracted from one volt ("1V"), and the absolute value is taken of the subtraction result to create a first difference value, and, if the first difference value is within a predetermined second range of values, then the processing circuit determines that the first difference value indicates that the movable bin is in a locked position, and that the removable magnetic cap is not present in the movable bin; and (j) in the third operating state, the magnetic sensor outputs the first signal having a third voltage magnitude, the first signal is communicated to at least one of the input/output interface circuit and the processing circuit, the third voltage magnitude is subtracted from 1V, and the absolute value is taken of the subtraction result to create a second difference value, and, if the second difference value is within a predetermined third range of values, then the processing circuit determines that the second difference value indicates that the movable bin is in a locked position, and that the removable magnetic cap is present in the movable bin.

18. The electronic lockbox of claim 17, wherein: at least one of the input/output interface circuit and the processing circuit includes an analog-to-digital converter that receives the first signal.

19. The electronic lockbox of claim 17, wherein: the magnetic sensor comprises a Hall effect sensor that exhibits a forward polarity response.

20. The electronic lockbox of claim 17, wherein: the magnetic sensor comprises a Hall effect sensor that exhibits a reverse polarity response.

* * * * *